United States Patent
Froggatt et al.

(10) Patent No.: US 11,940,305 B2
(45) Date of Patent: Mar. 26, 2024

(54) METHODS AND APPARATUS FOR DETERMINING SHAPE PARAMETER(S) USING A SENSING FIBER HAVING A SINGLE CORE WITH MULTIPLE LIGHT PROPAGATING MODES

(71) Applicant: Intuitive Surgical Operations, Inc., Sunnyvale, CA (US)

(72) Inventors: Mark E. Froggatt, Blacksburg, VA (US); Dawn K. Gifford, Blacksburg, VA (US); Eric E. Sanborn, Blacksburg, VA (US); Alexander K. Sang, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 1 day.

(21) Appl. No.: 17/899,463

(22) Filed: Aug. 30, 2022

(65) Prior Publication Data

US 2022/0412778 A1    Dec. 29, 2022

Related U.S. Application Data

(63) Continuation of application No. 17/178,061, filed on Feb. 17, 2021, now Pat. No. 11,473,941, which is a (Continued)

(51) Int. Cl.
  *G01D 5/353*    (2006.01)
  *G01J 1/04*    (2006.01)
  *G02B 6/02*    (2006.01)

(52) U.S. Cl.
  CPC ........ *G01D 5/35316* (2013.01); *G01J 1/0425* (2013.01); *G02B 6/02042* (2013.01); *G02B 6/02085* (2013.01); *G02B 6/02142* (2013.01)

(58) Field of Classification Search
  None
  See application file for complete search history.

(56) References Cited

U.S. PATENT DOCUMENTS

| | | |
|---|---|---|
| 4,915,468 A | 4/1990 | Kim et al. |
| 5,224,182 A | 6/1993 | Murphy et al. |
| (Continued) | | |

FOREIGN PATENT DOCUMENTS

| | | |
|---|---|---|
| CN | 101236075 A | 8/2008 |
| CN | 104169678 A | 11/2014 |
| (Continued) | | |

OTHER PUBLICATIONS

Amanzadeh M., et al., "Recent Developments in Fibre Optic Shape Sensing," Measurement, Nov. 2018, vol. 128 (1), pp. 119-137.
(Continued)

*Primary Examiner* — Rhonda S Peace
(74) *Attorney, Agent, or Firm* — Schwegman, Lundberg & Woessner, P.A.

(57) ABSTRACT

Example embodiments include an optical interrogation system with a sensing fiber having a single core, the single core having multiple light propagating modes. Interferometric apparatus probes the single core multimode sensing fiber over a range of predetermined wavelengths and detects measurement interferometric data associated with the multiple light propagating modes of the single core for each predetermined wavelength in the range. Data processing circuitry processes the measurement interferometric data associated with the multiple light propagating modes of the single core to determine one or more shape-sensing parameters of the sensing fiber from which the shape of the fiber in three dimensions can be determined.

20 Claims, 21 Drawing Sheets

Related U.S. Application Data continuation of application No. 16/474,531, filed as application No. PCT/US2017/067588 on Dec. 20, 2017, now Pat. No. 11,035,699.

(60) Provisional application No. 62/440,035, filed on Dec. 29, 2016.

(56) References Cited

U.S. PATENT DOCUMENTS

| | | |
|---|---|---|
| 5,444,803 A | 8/1995 | Kim et al. |
| 5,798,521 A | 8/1998 | Froggatt |
| 5,848,204 A | 12/1998 | Wanser |
| 6,049,727 A | 4/2000 | Crothall |
| 6,069,985 A | 5/2000 | Albin et al. |
| 6,621,960 B2 | 9/2003 | Wang et al. |
| 7,538,883 B2 | 5/2009 | Froggatt |
| 7,781,724 B2 | 8/2010 | Childers et al. |
| 8,180,185 B2 | 5/2012 | Xia et al. |
| 8,780,339 B2 | 7/2014 | Udd |
| 9,772,176 B2 | 9/2017 | Froggatt et al. |
| 9,993,617 B1 | 6/2018 | Leo |
| 10,416,391 B2 | 9/2019 | Froggatt et al. |
| 10,422,631 B2 | 9/2019 | Reaves et al. |
| 10,545,283 B2 | 1/2020 | Froggatt et al. |
| 10,739,529 B2 | 8/2020 | Froggatt et al. |
| 10,775,157 B2 | 9/2020 | Gifford et al. |
| 10,782,121 B2 | 9/2020 | Marsden et al. |
| 10,823,627 B2 | 11/2020 | Sanborn et al. |
| 10,962,351 B2 | 3/2021 | Roye et al. |
| 10,976,155 B2 | 4/2021 | Froggatt et al. |
| 10,983,268 B2 | 4/2021 | Froggatt et al. |
| 11,035,699 B2 | 6/2021 | Froggatt et al. |
| 11,162,782 B2 | 11/2021 | Marsden et al. |
| 2006/0013523 A1 | 1/2006 | Childlers |
| 2006/0093012 A1 | 5/2006 | Singh et al. |
| 2007/0286547 A1 | 12/2007 | Lieberman et al. |
| 2009/0123111 A1 | 5/2009 | Udd |
| 2010/0080502 A1 | 4/2010 | Nishikawa et al. |
| 2010/0296080 A1 | 11/2010 | Nishikawa et al. |
| 2015/0029511 A1 | 1/2015 | Hooft et al. |
| 2021/0172768 A1 | 6/2021 | Froggatt et al. |
| 2021/0223030 A1 | 7/2021 | Horikx et al. |
| 2022/0057238 A1 | 2/2022 | Van Dusschoten et al. |
| 2022/0412778 A1* | 12/2022 | Froggatt ............ G01D 5/35316 |
| 2023/0137926 A1* | 5/2023 | Ahmad ................ G01B 9/0209 356/477 |

FOREIGN PATENT DOCUMENTS

| | | |
|---|---|---|
| CN | 203932660 U | 11/2014 |
| CN | 205642682 U | 10/2016 |
| EP | 3563119 A1 | 11/2019 |
| EP | 3663707 A1 | 8/2020 |
| WO | WO-2011034584 A2 | 3/2011 |
| WO | WO-2015017270 A1 | 2/2015 |
| WO | WO-2016099976 A1 | 6/2016 |
| WO | WO-2016122742 A2 | 8/2016 |
| WO | WO-2018125713 A1 | 7/2018 |

OTHER PUBLICATIONS

Extended European Search Report for Application No. EP17886412, mailed on Nov. 25, 2019, 10 pages (ISRG09260/EP).

Extended European Search Report for Application No. EP21200293.5, mailed on Jan. 21, 2022, 6 p. (P05723-WO-EP-DIV).

Feng D., et al., "Compact Optical Fiber 3D Shape Sensor Based on a Pair of Orthogonal Tilted Fiber Bragg Gratings," Scientific Reports, Nov. 30, 2015, vol. 5 (1), pp. 1-7.

Guo T., et al., "Polarimetric Multi-mode Tilted Fiber Grating Sensors," Optics Express, Mar. 2014, vol. 22 (6), pp. 7331-7336.

International Search Report and Written Opinion for Application No. PCT/US2017/067588. mailed on Apr. 11, 2018, 17 pages (ISRG09260/PCT).

Vertut, J, and Coiffet, P., "Robot Technology: Teleoperation and Robotics Evolution and Development," English translation, Prentice-Hall, Inc., Inglewood Cliffs, Nj, USA 1986, vol. 3A, 332 pages.

Extended European Search Report for Application No. EP23191086.0, dated Nov. 24, 2022, 08 pages.

* cited by examiner 1 core (small)
3 modes
9 measurements 1 core
200 modes
40,000 measurements 1 core (ring)
30 modes
1000 measurements

METHODS AND APPARATUS FOR DETERMINING SHAPE PARAMETER(S) USING A SENSING FIBER HAVING A SINGLE CORE WITH MULTIPLE LIGHT PROPAGATING MODES This application is a continuation of and claims the benefit of priority under 35 U.S.C. § 120 to U.S. patent application Ser. No. 17/178,061, filed on Feb. 17, 2021, which is a continuation of and claims the benefit of priority under 35 U.S.C. § 120 to U.S. patent application Ser. No. 16/474,531, filed on Jun. 27, 2019, which is a U.S. National Stage Filing under 35 U.S.C. 371 from International Application No. PCT/US2017/067588, filed on Dec. 20, 2017, and published as WO 2018/125713 A1 on Jul. 5, 2018, which claims the priority and benefit of U.S. Provisional Patent Application 62/440,035, filed Dec. 29, 2016, entitled "METHODS AND APPARATUS FOR DETERMINING SHAPE PARAMETER(S) USING A SENSING FIBER HAVING A SINGLE CORE WITH MULTIPLE LIGHT PROPAGATING MODES," each of which is incorporated herein by reference in its entirety.

TECHNICAL FIELD

The technology described in this application relates to optical interrogation system measurements used for fiber optic shape and other sensing applications.

INTRODUCTION

Optical strain sensing is a technology useful for measuring physical deformation of a waveguide caused by, for example, the change in tension, compression, or temperature of an optical fiber. Measuring the shape of an optical fiber using multiple single mode cores to determine parameters including pitch, yaw, twist, and strain has been demonstrated. Shape is the position or orientation of the fiber in three dimensions. A continuous measure of strain along the length of a core can be derived by interpreting the optical response of the core using swept wavelength inteferometery typically in the form of Optical Frequency Domain Reflectometry (OFDR) measurements. With knowledge of the relative positions of the cores along the length of the fiber, these independent strain signals may be combined to gain a measure of the strain profile applied to the multi-core optical fiber. The strain profile of the fiber refers to the measure of applied bend strain, twist strain, and/or axial strain along the length of the fiber at a high (e.g., less than 50 micrometers) sample resolution. A non-limiting example application is robotic arms used in surgical or other environments. Previous patents have described OFDR-based shape sensing with multiple single mode cores (e.g., see U.S. Pat. Nos. 7,781,724 and 8,773,650 incorporated by reference).

Fibers with multiple single mode cores are difficult and costly to manufacture. Cost is further increased when multi-core fibers must be spun or helically-twisted during manufacture, which is the case for prior multi-core shape sensing fiber. If a single core, unspun fiber could be used to sense shape, then the cost of the fiber sensor could be significantly reduced. For example, mass produced, standard telecom fiber that has single cores and is unspun sells for pennies per meter. But there are several technological challenges (described below) that must be addressed and overcome in order for a single core, multiple mode fiber to sense shape.

SUMMARY

Example embodiments include an optical interrogation system and method that includes a sensing fiber having a single core, where the single core has multiple light propagating modes. The system includes interferometric apparatus that probes the single core over a range of predetermined wavelengths and detects measurement interferometric data associated with the multiple light propagating modes of the single core for each predetermined wavelength in the range. Data processing circuitry processes the measurement interferometric data associated with the multiple light propagating modes of the single core to determine a shape-sensing parameter of the sensing fiber. In an example application, the data processing circuitry determines a shape of the sensing fiber based on the shape-sensing parameter.

Examples of a shape-sensing parameter include a bend parameter and/or a twist parameter. In one example embodiment, the data processing circuitry processes the measurement interferometric data associated with the multiple light propagating modes of the single core to determine a plurality of shape-sensing parameters including the shape-sensing parameter, and wherein the plurality of shape-sensing parameters includes strain, bend, and twist parameters.

The single core may have a shape that limits a number of the multiple light propagating modes below a predetermined number while providing a predetermined sensitivity to the twist parameter. One example is where the single core is ring-shaped in cross-section. An even more specific ring-shaped core example is a ring-shaped cored that has a radius that permits fewer than 40 modes of light to propagate along the single core. Another example is where the single core is a solid core. A radius of the solid core permits less than six modes of light to propagate along the single core.

In example embodiments, the interferometric apparatus may include multiple interferometers with multiple reference branches and multiple measurement branches having an array of corresponding multiple single core, single mode fibers. A tunable laser generates light over the range of predetermined wavelengths. Each fiber of the array has a different optical delay. A collimator collimates light from the single core and de-collimate light to the single core, and a microlens array receives and focuses collimated light from the collimator onto the array of corresponding multiple single core, single mode fibers. The different optical delays produce multiple coupling coefficients that appear on different ones of the array of corresponding multiple single core, single mode fibers.

In an example implementation, the single core includes an overlapping grating pattern, where each overlapping grating in the overlapping grating pattern is tilted with respect to a longitudinal axis of the single core. The overlapping grating pattern varies with bend, strain, and twist applied to the sensing fiber. The overlapping grating pattern is associated with (i) a cross-sectional index perturbation for the sensing fiber as a function of distance along the sensing fiber and (ii) coupling coefficients between back-scattered light propagating modes for the sensing fiber.

In an example application, the interferometric apparatus measures a phase and an amplitude of the coupling coefficients, and the data processing circuitry determines a difference between the measured coupling coefficient phase and amplitude and a predetermined baseline coupling coefficient phase and amplitude for the sensing fiber.

In an example embodiment, a non-transitory machine-readable medium stores a plurality of machine-readable instructions which, when executed by one or more processors associated with a medical device, are adapted to cause the one or more processors to perform processing steps of the methods described herein.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, components, and devices are omitted so as not to obscure the description with unnecessary detail. It will be appreciated by those skilled in the art that diagrams herein can represent conceptual views of illustrative circuitry, components, or other functional units.

Two Dimensional Waveguide Example

Figure 1A:
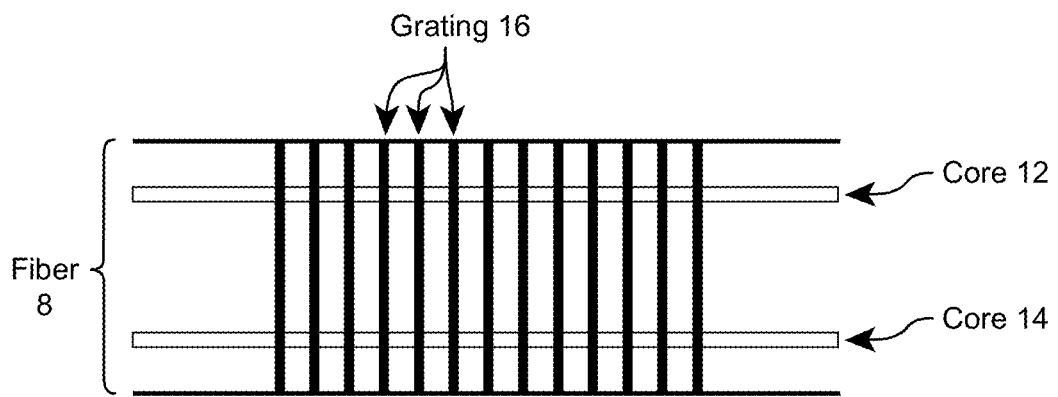
FIGS. 1A and 1B show a fiber with two single-mode cores displaced from the central axis and a Bragg grating in an unbent and bent shape.
Figure 1B:
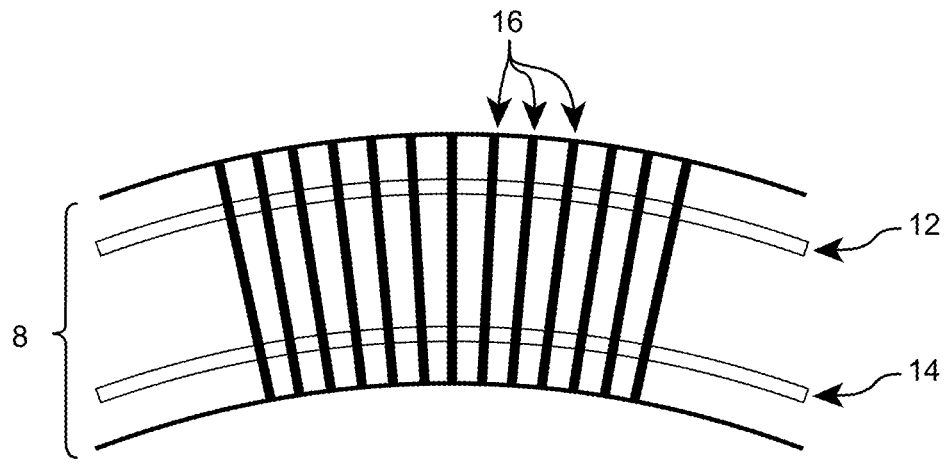

Before considering a single core fiber in three dimensions, consider a fiber with two single-mode cores displaced from the central axis and a Bragg grating present in the structure from two dimensions. FIGS. 1A and 1B show (two-dimensionally) a fiber 8 with two single-mode cores 12, 14 displaced from the central axis and a Bragg grating 16 in an unbent and bent shape, respectively. The grating forms a set of vertical planes in the core in FIG. 1A and tilted planes in FIG. 1B. With the fiber unbent, the two cores reflect the same wavelength. When the fiber is bent, the top core is stretched and the bottom core is compressed, which changes the periodicity of the Bragg grating 16 seen by each core. As a result, a different wavelength is reflected at the grating in each of the two single-mode cores.

Figures 2, 3:
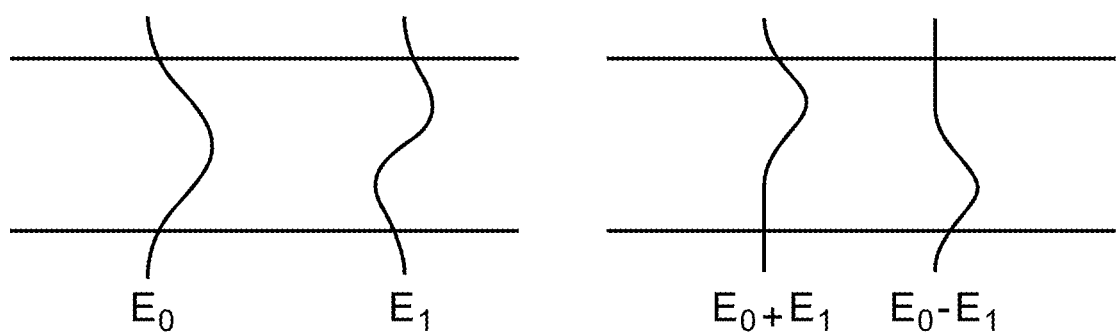
FIG. 2 illustrates first and second order mode fields in a two dimensional waveguide.
FIG. 3 shows an example of a sum and a difference of first and second order modes in a two dimensional.

If there is only a single core in the fiber, but one that supports two field propagation modes, then the two modes will have electric field envelopes that look like those in FIG. 2 which illustrates a first lower order mode field $E_0$ and a second higher order mode field $E_1$ in a two dimensional fiber waveguide. If both modes are launched, they propagate down the fiber with a linearly varying phase between them. When the two modes are in phase, their fields will sum and the total $[E_0+E_1]$ will be weighted toward the top of the waveguide, and when they are out of phase, their fields will subtract and the combination [$E_0$-$E_1$] will be weighted toward the bottom of the waveguide as illustrated by the "peaks" shown in FIG. 3.

Figure 4A:
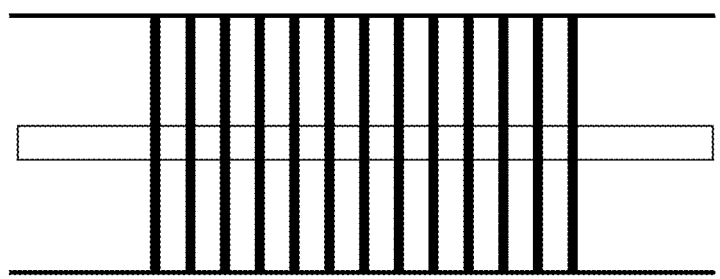
FIGS. 4A and 4B show straight and bent conditions of a two dimensional waveguide and how it affects the spacing in a Bragg grating in the waveguide.
Figure 4B:
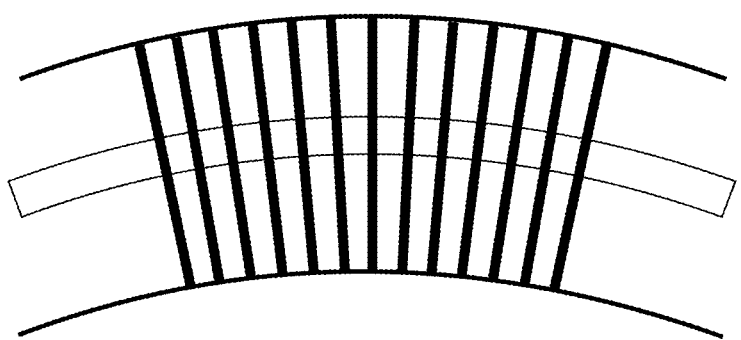

By using the sum and difference of the modes, reflections preferentially weighted in the top or the bottom of the core can be used to detect bending of the waveguide, i.e., to detect strain which is one of the shape determination parameters. FIGS. 4A and 4B show straight and bent conditions of a two dimensional fiber waveguide and how it affects the spacing in a Bragg grating in the waveguide. Bending the waveguide causes the top and bottom of the waveguide to expand or compress. If there is a grating physically in the core, then reflections from this core grating can be detected in both the top and the bottom of the waveguide. In FIG. 4B, the sum of the fields will measure the grating in the top of the core, and the difference of the fields will measure the grating in the bottom of the core.

Figure 5:
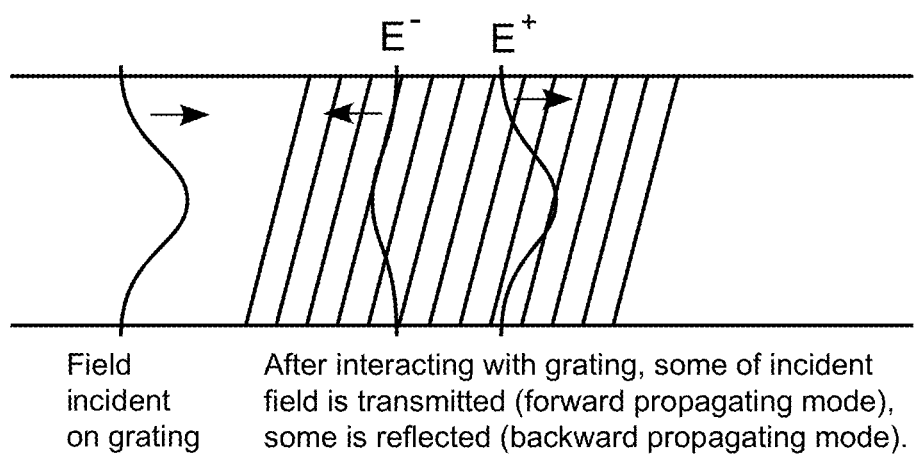
FIG. 5 illustrates coupling of a forward propagating mode to a backward propagating mode using a Bragg grating.
Figure 6A:
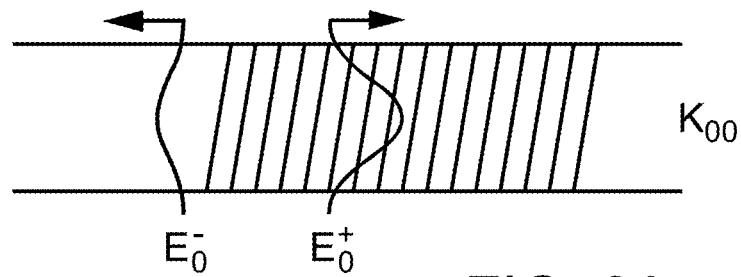
FIGS. 6A-6D show all of the forward to backward coupling modes in the example from FIG. 5.
Figure 6B:
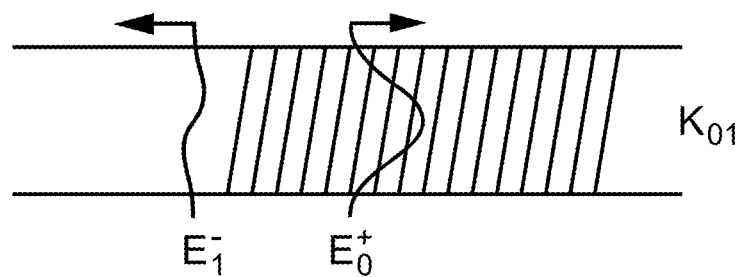
Figure 6C:
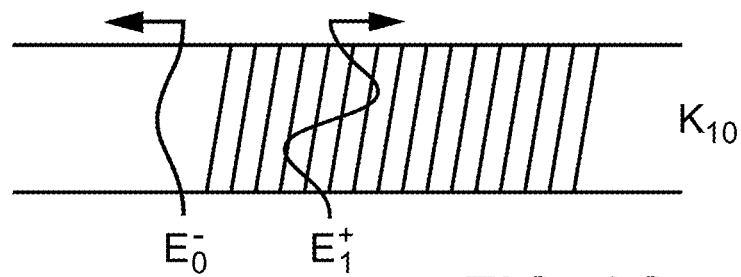
Figure 6D:
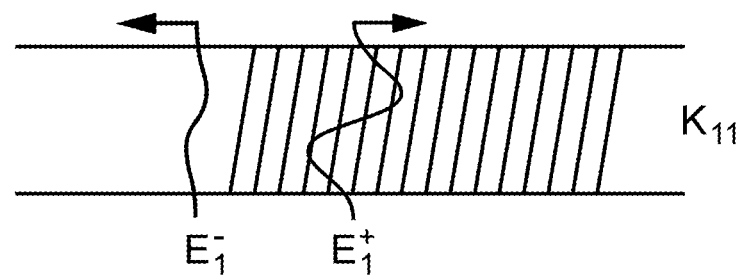

Rather than directly measuring the propagating modes, measuring the cross coupling of those modes in the core grating can provide a measurement of the deformation of the grating which can be used to determine shape parameters. Cross coupling coefficients, κ, represent the scattering of light from the forward propagating modes to the backward propagating modes in the core grating. FIG. 5 illustrates an electric field incident on and interacting with the grating resulting in some of the incident field $E^+$ being transmitted (a forward propagating mode) and some of the incident field $E^-$ being reflected (a backward propagating mode). Another way of describing this interaction is "cross coupling" (or simply "coupling") the forward propagating mode and the backward propagating mode in the grating.

For a two mode, two dimensional wave guide, four types of backward coupling can occur including: coupling from the forward propagating first order mode to the backward propagating first order mode (and having a coupling coefficient $\kappa_{00}$), coupling from the forward propagating first order mode to the backward propagating second order mode (and having a coupling coefficient $\kappa_{01}$), coupling from the forward propagating second order mode to the backward propagating second order mode (and having a coupling coefficient $\kappa_{11}$), and coupling from the forward propagating second order mode to the backward propagating first order mode (and having a coupling coefficient $\kappa_{10}$). FIGS. 6A-6D show all of the forward to backward coupling modes in this example.

Three Dimensional Waveguide Example

Modeling waveguide systems as ideal lossless waveguide systems, coupling coefficients $\kappa_{01}=\kappa_{10}^*$, and so there are three independent coupling coefficients available to measure: $\kappa_{00}$, $\kappa_{01}$, and $\kappa_{11}$. The local pattern of the Bragg grating determines the magnitude of the cross coupling or the coupling coefficients. As a result, distributed measurements of these three coupling coefficients can be used to calculate the local frequency of the grating (which determined by the tilt of the grating, which in turn determined by the amount of bending of the grating) at every point along the fiber wave guide. The manner in which these coupling coefficients are measured, and the corrections used to calculate the local frequency of a Bragg grating in the fiber core are described in detail below for a non-limiting and example case of a three dimensional waveguide.

Previous fiber-optic shape sensing systems use a multi-core fiber or multiple single core fibers, where each core is a single mode fiber and typically has gratings written along the length of the core. Bend, twist, and/or strain cause local stretching or compressing of the grating pattern. These grating changes relate directly to the applied bend, twist, or strain and can be quantified by measuring the phase change vs. distance along the fiber with respect to a reference state. A matrix can be calculated via knowledge of the fiber geometry and/or calibration, and used to convert phase change in four cores to bend, twist, and strain.

Figure 7A:
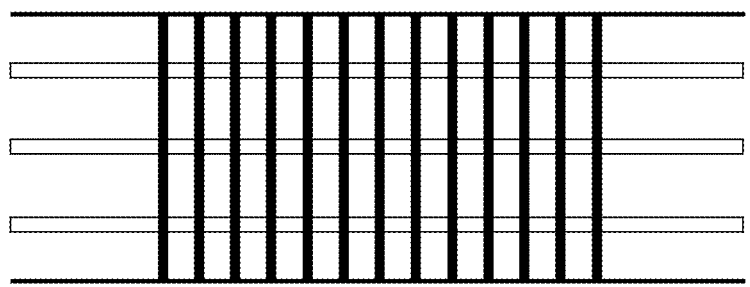
FIG. 7A shows a grating in a multi-core fiber.
Figure 7B:
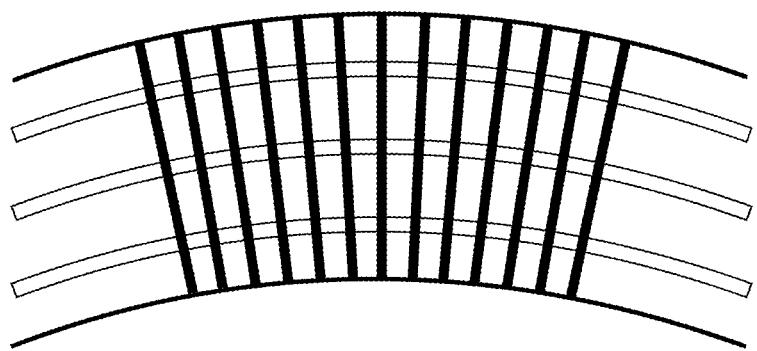
FIG. 7B shows the same fiber when bent.
Figure 7C:
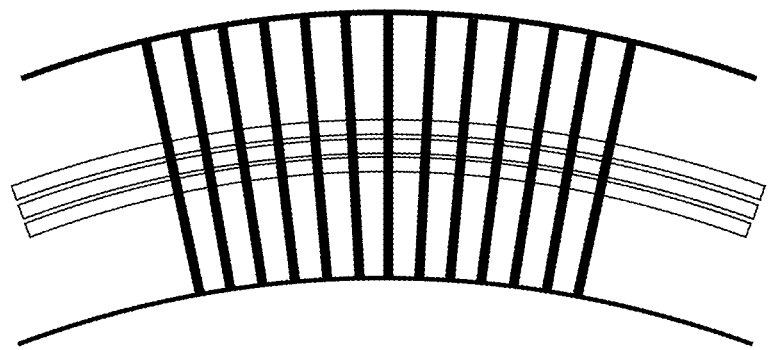
FIG. 7C shows a large core fiber with the same grating pattern bent in the same way.

In this example case of a single core fiber with multiple modes, the variations in the core grating pattern are measured and processed with distance along the fiber and with cross-sectional location in the fiber core. For example, if the fiber is bent in one direction, the grating pattern is compressed on the side of the core on the inside of the bend, stretched on the side of the core on the outside of the bend, and unchanged along the neutral axis. FIG. 7A shows a grating in an unbent multi-core single mode fiber, and FIG. 7B shows the same multi-core when bent. FIG. 7C shows a single core multiple mode fiber with the same grating pattern bent in the same way. The periodicity of the grating pattern varies across the cross-sectional area of the core.

Figure 8:
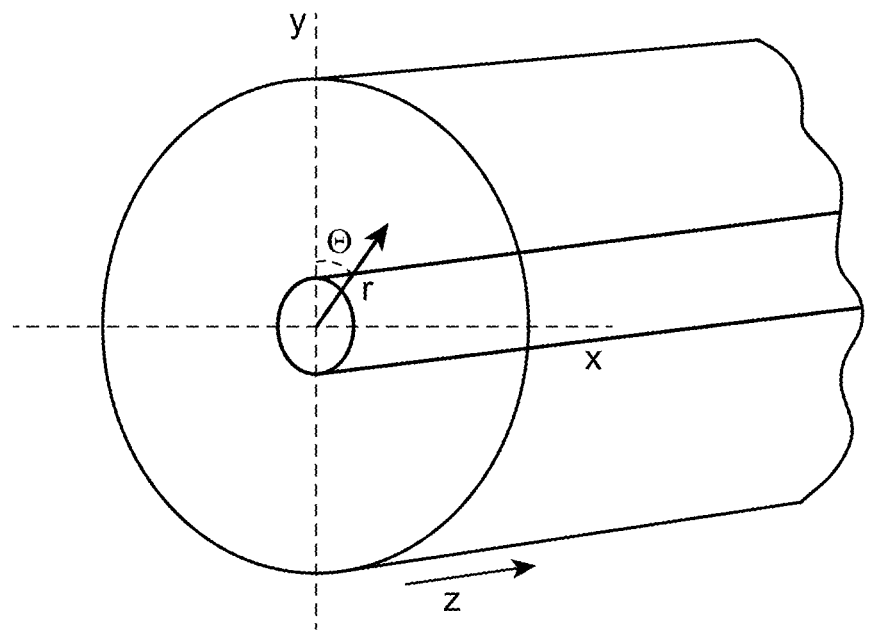
FIG. 8 is a reference diagram of a single core fiber with axis and angle labels.

FIG. 8 is a reference diagram of a single core fiber with x, y, z axes, a vector/radius r, and an angle θ. These labels are used in the some of the following figures and in the description below.

Although a single grating in the core may be used to determine strain, it is not sufficient by itself to determine another important shape parameter—twist. Twist may be measured using a helixed fiber that uses multiple single mode cores disposed in a helical manner as described in the patents referenced in the introduction. But with a single core, multiple mode sensing fiber, a helixed fiber is no longer available for measuring twist.

Figure 9:
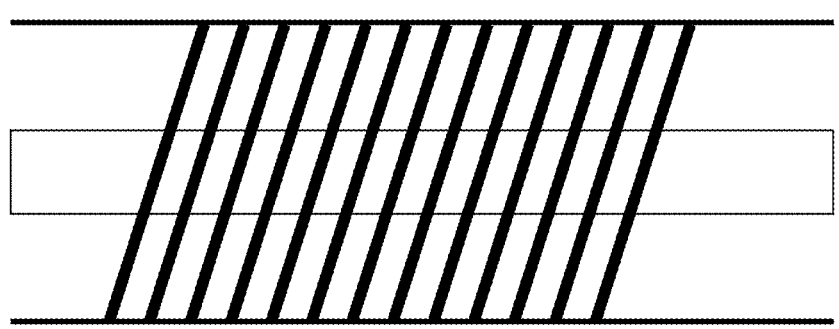
FIG. 9 shows an example tilted Bragg grating.
Figure 10:
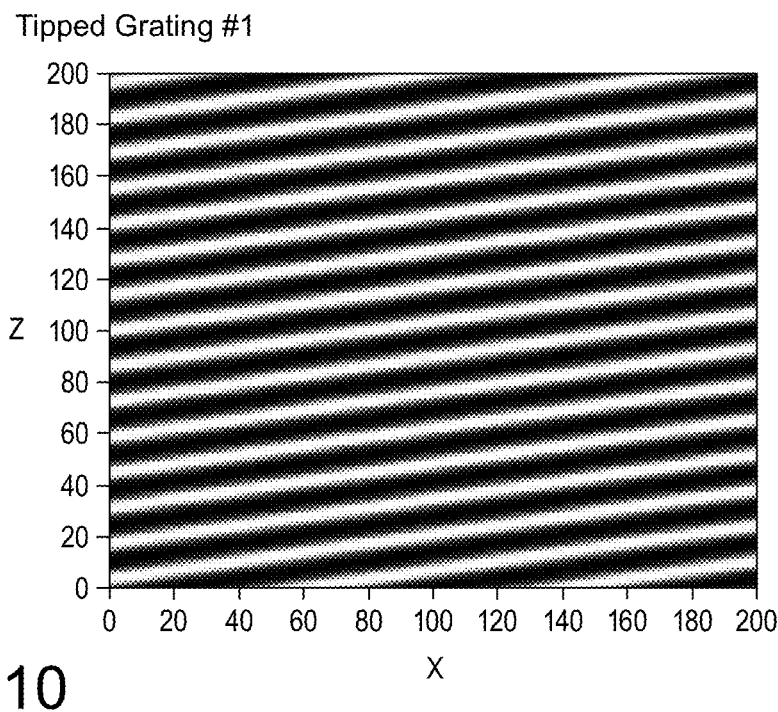
FIG. 10 shows an example intensity plot of the index modulation of a tilted Bragg grating.

In various embodiments, a grating pattern can be used to detect twist in the fiber. Construction of an example grating pattern is now described. FIG. 9 shows an example of a tilted Bragg grating written in a single core. FIG. 10 shows an example intensity plot of the index modulation of an example tilted Bragg grating. An index modulation is another way to represent the grating pattern. Note the x axis for the core is plotted horizontally, and z axis for the core is plotted vertically.

Figure 11:
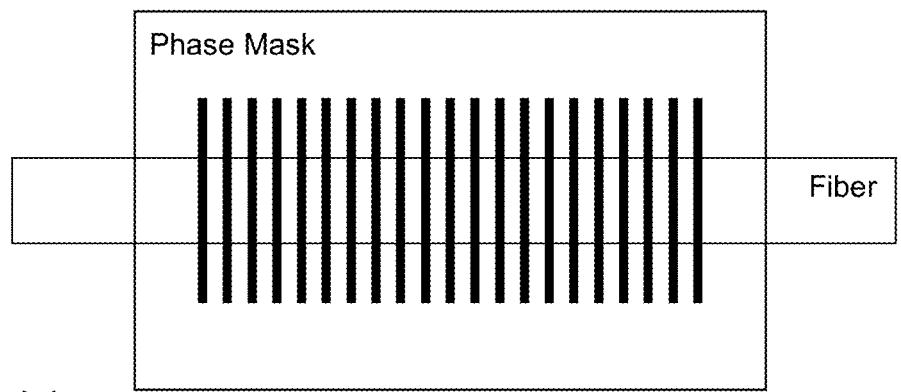
FIG. 11 shows an example phase mask to write a Bragg grating.
Figure 12:
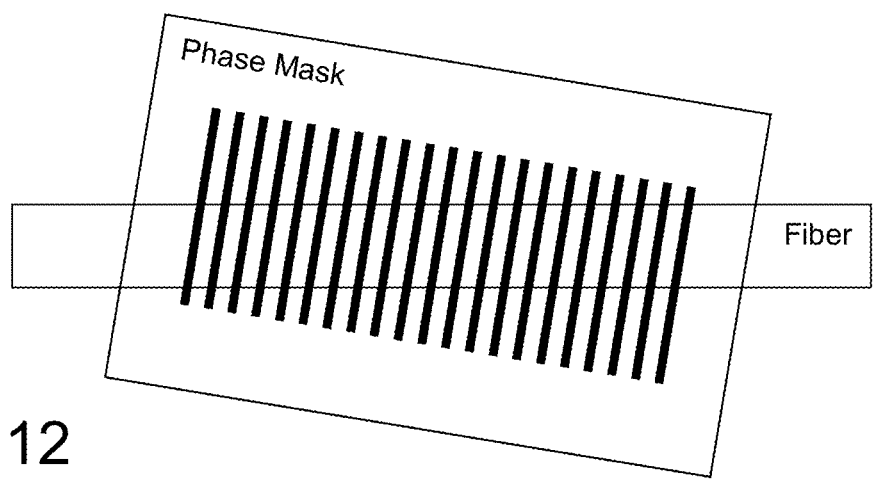
FIG. 12 illustrates an example tipped phase mask to produce a tilted Bragg grating.

This type of grating can be written in a fiber core using a phase mask that is tilted with respect to the fiber. FIG. 11 shows an example phase mask to write a Bragg grating in a typical orientation with respect to the fiber when writing gratings. FIG. 12 shows how the mask can be tilted to write a tilted grating. Alternatively, the mask can be made with the pattern tilted in order to write the desired tilted grating.

Figure 13:
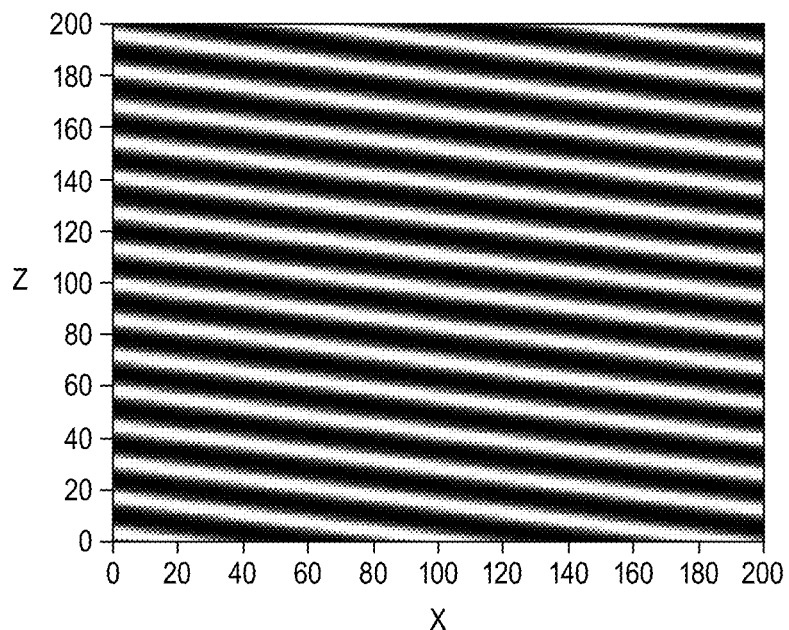
FIG. 13 shows an example intensity plot of the index change created by a tilted grating.
Figure 14:
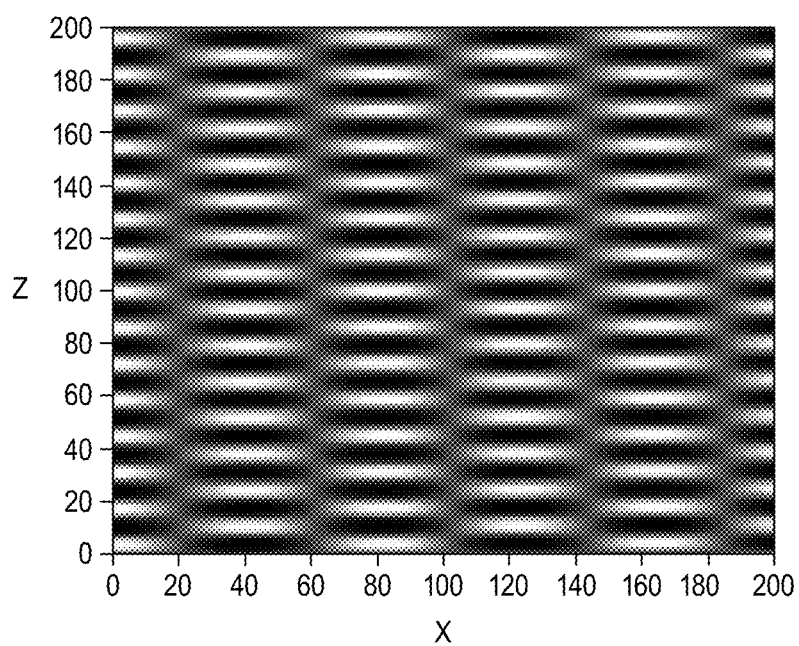
FIG. 14 shows an example intensity plot of a pattern created when two tilted gratings are written overtop of one another.

Then, a second tilted grating is written on the core as shown in the example intensity plot of the index modulation or index change of FIG. 13, but tilted in an opposing direction in the same location. The result is constructive and destructive interference. FIG. 14 shows an example intensity plot of a grating pattern created when the two tilted gratings are written overtop of one another in the core. The dim/blurry areas along the vertical z axis at about 20, 60, 140, and 180 units of distance on the hroizontal x axis represent areas where destructive interference has "washed out" the grating amplitude.

Figure 15:
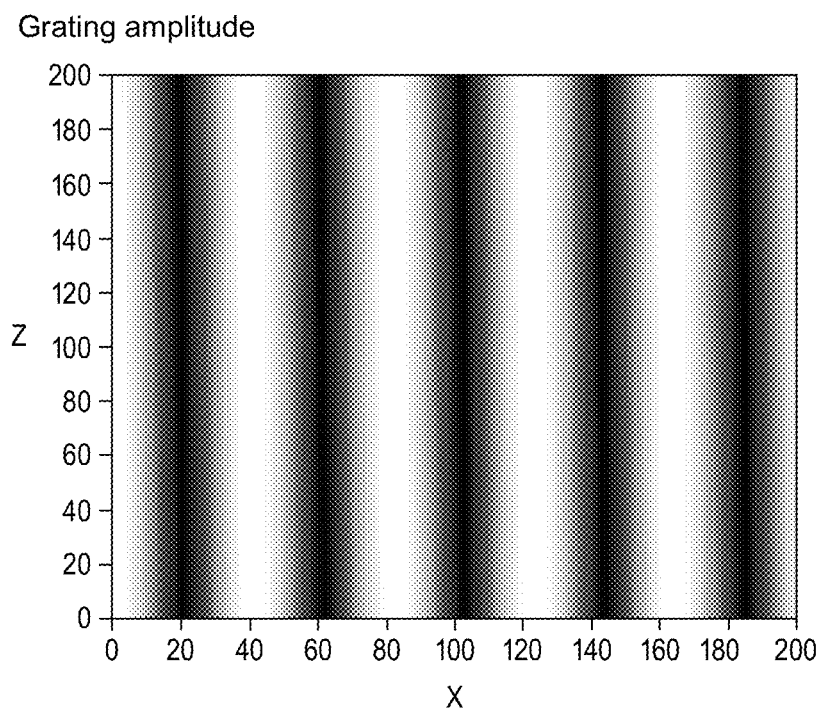
FIG. 15 shows an example amplitude envelope of overlapped tilted gratings.

FIG. 15 shows an example amplitude envelope of the overlapped tilted gratings. Lighter areas represent stronger grating amplitude, and darker areas represent weaker grating amplitude where the grating amplitude is washed out. This plot represents the grating amplitude along the length of the fiber (axis z) vs. one cross sectional axis of the fiber, x.

Figure 16:
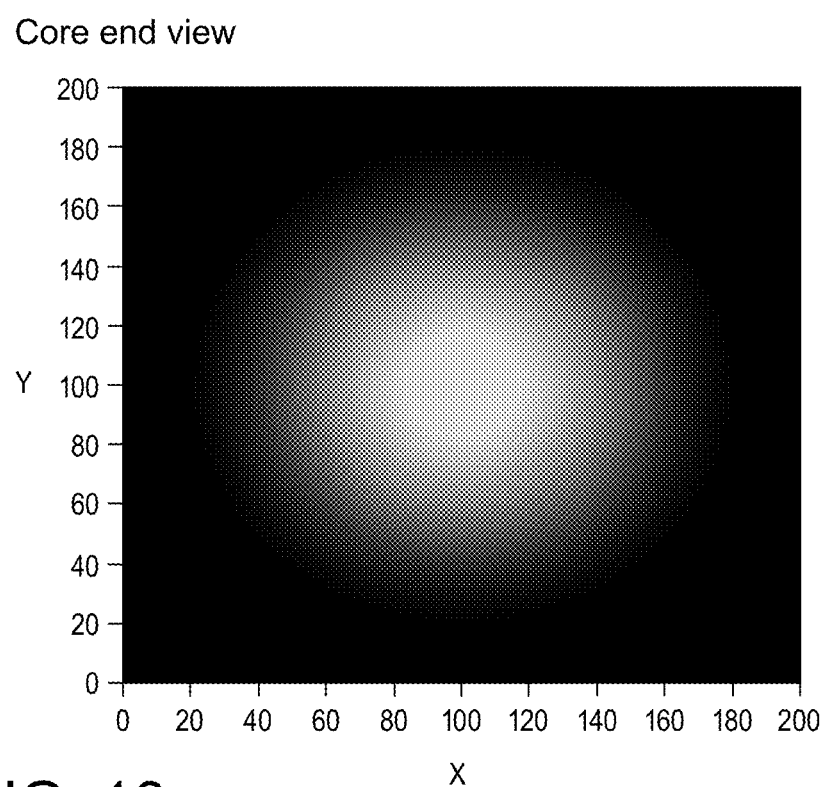
FIG. 16 is an example intensity plot of a germanium doping concentration in a fiber core.

FIG. 16 is an example intensity plot of a germanium doping concentration in an example fiber core looking at a cross section of the core in the x-y plane. This example fiber is only photosensitive in the core, and the grating only exists in the core.

Figure 17:
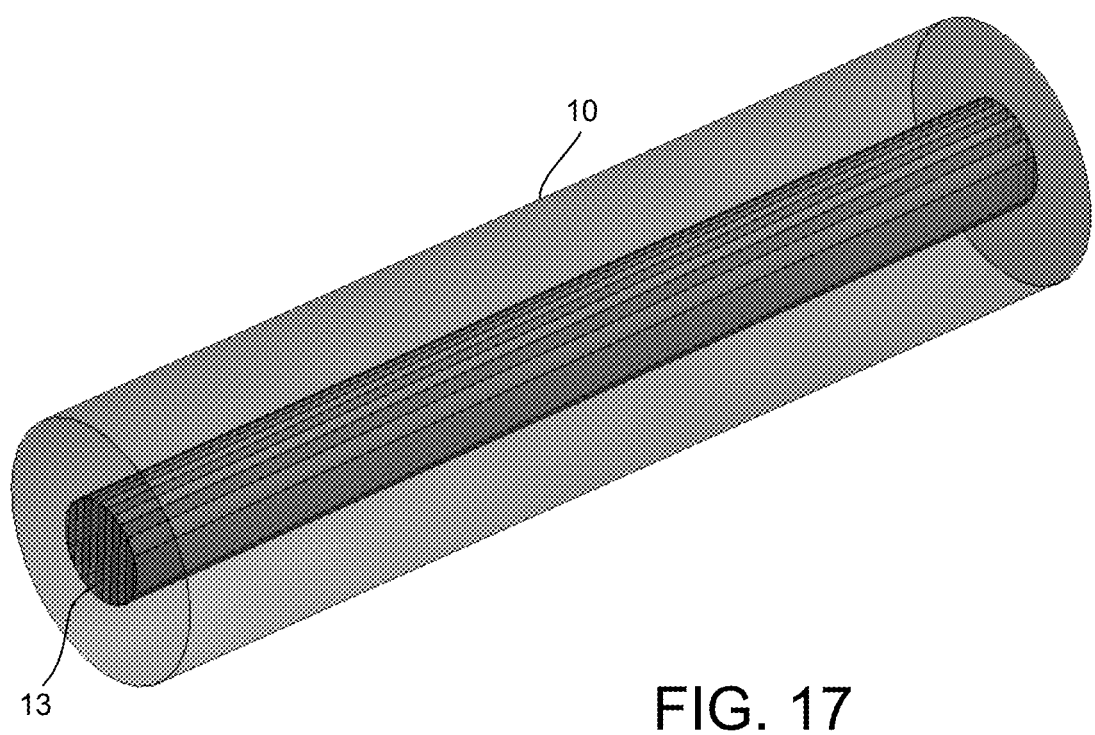
FIG. 17 illustrates intra-core features created by writing tilted gratings on top of one another within the optical fiber core.
Figure 18:
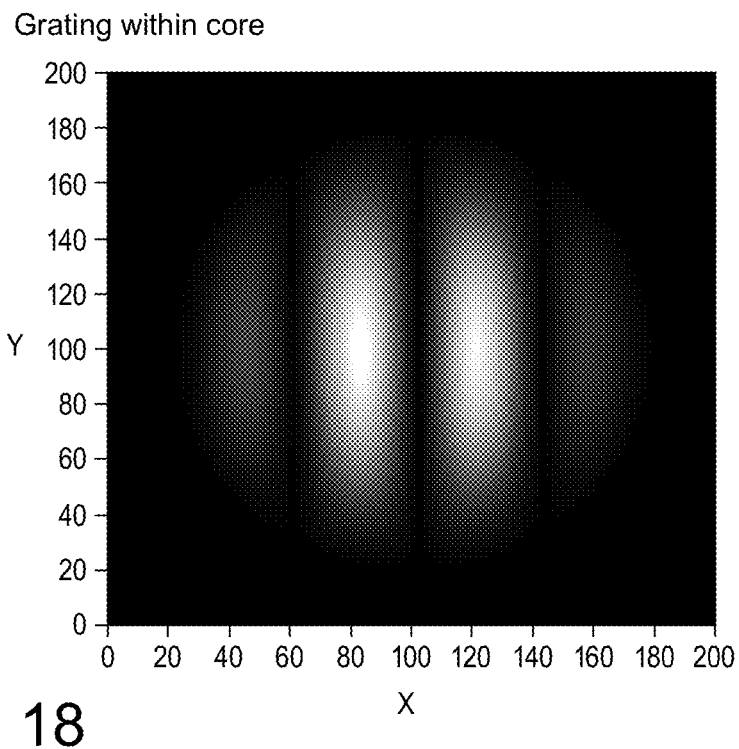
FIG. 18 is an example intensity plot of an end view of the fiber with features created by writing tilted gratings on top of one another in the core.

FIG. 17 shows the grating amplitude features created by writing tilted gratings on top of one another within core 13 of the optical fiber 10. FIG. 18 is an example intensity plot of an end view of the fiber in the x-y plane created by writing tilted gratings on top of one another.

A grating pattern (like the pattern described above and an amplitude like that shown in FIG. 15) written in a single core varies with bend, strain, and twist. Thus, various embodiments determine the cross-sectional variation in the grating pattern—which can also be described as the cross-sectional index perturbation—as a function of distance along the fiber. If the cross-sectional variation in the grating pattern can be determined, then the bend, strain, and twist as function of distance along the fiber can be determined.

Applying coupled-mode theory, the index perturbation in a fiber core determines the cross-coupling between forward traveling and backward traveling modes. In this application, the index perturbation is the core grating. The core is probed with light having forward traveling modes, and the backward traveling modes created by the grating are detected. Because the input (forward traveling) modes may be determined in advance, and because the output (backward traveling) modes can be measured and the coupling coefficients determined, mode coupling is used the example embodiments to determine the index perturbation (the state of the grating such as pulled, compressed, bent, and/or twisted) that was present.

The following assumes that the single core guides three modes for a detailed example. However, a single core that guides more than three modes may also be used.

A representation of the index perturbation (the core grating) across the cross section of the example fiber at any given location may be determined by measuring the coupling coefficients between the back scattered modes. Assume that the single core fiber supports three modes $E_0$ (circular), $E_H$ (horizontal), and $E_V$ (vertical), two of them degenerate. The three modes correspond to three linear polarizations $LP_{01}$ (circular), $LP_{11x}$ (horizontal), $LP_{11y}$ (vertical) as set forth here:

$$E_0 = LP_{01} = e^{-\frac{r^2}{w_0}} e^{i\beta_0 z}$$

$$E_H = LP_{11x} = e^{-\frac{r^2}{w_1}} r\sin\theta e^{i\beta_1 z}$$

$$E_V = LP_{11y} = e^{-\frac{r^2}{w_1}} r\cos\theta e^{i\beta_1 z}$$

The variables r and θ and the z axis are shown in FIG. 8. The variable w is the Gaussian width of the mode and β is the propagation constant of the mode.

Figure 19:
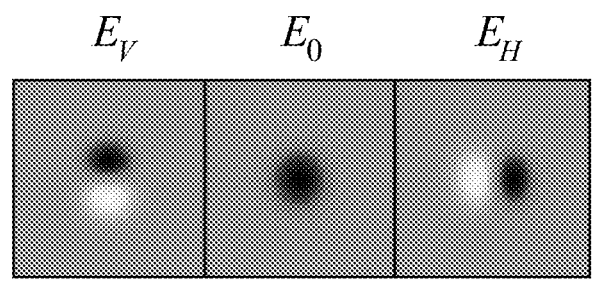
FIG. 19 shows scalar field plots of three lowest order LP modes.

FIG. 19 shows scalar field plots of three lowest order LP modes $E_0$ (circular), $E_H$ (horizontal), and $E_V$ (vertical).

Based on perturbation theory, (see, e.g., *Fundamentals of Optical Waveguides*, Katsunari Okamoto, Elsevier 2006), the coupling factor, $\kappa_{mn}$ between any forward propagating mode, $E_m$ and any backward propagating mode $E_n$ is given by the equation below.

$$\kappa_{mn} = \iint E_m(x,y)\eta(x,y)E_n^*(x,y)e^{i(\beta_m+\beta_n-k)z} dx\, dy$$

Here $\eta(x,y)e^{-ikz}$ is the periodic index perturbation (the grating in the core) within the optical fiber, $\beta_m$ and $\beta_n$ are the propagation constants of the two non-degenerate modes, x and y are the cross sectional axes, and z is the dimension along the axis of the fiber.

Expressing this equation in polar coordinates:

$$\kappa_{mn} = \int_0^a \int_0^{2\pi} E_m(r,\theta)\eta(r,\theta)E_n^*(r,\theta)e^{i(\beta_m+\beta_n-k)z} r\, dr\, d\theta.$$

Six different decomposition functions, $\xi_{mn}(r,\theta)$ are available for determining $\eta(r,\theta)$:

$$\xi_{mn}(r,\theta) = E_m(r,\theta)E_n^*(r,\theta)$$

Figure 20:
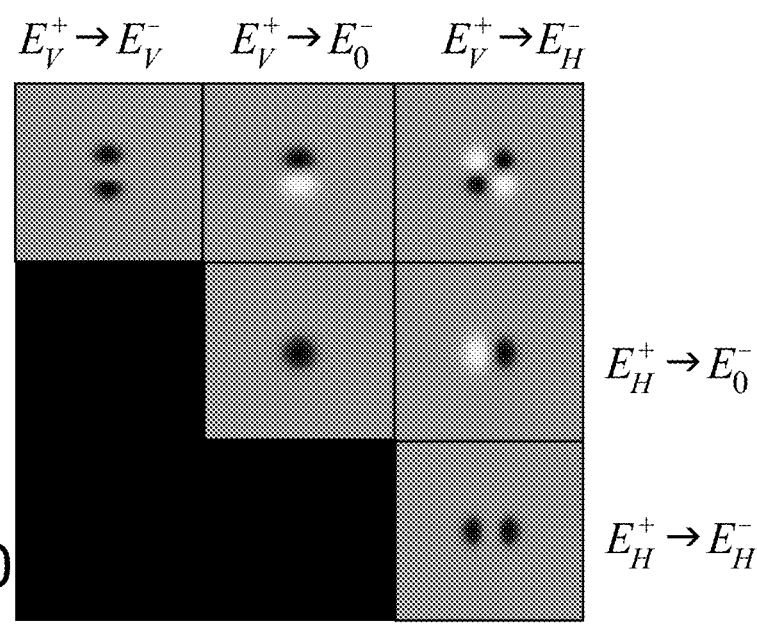
FIG. 20 shows decomposition functions for decomposing index perturbation.

FIG. 20 illustrates the six decomposition functions of the six cross coupling possibilities for this example.

Figure 21:
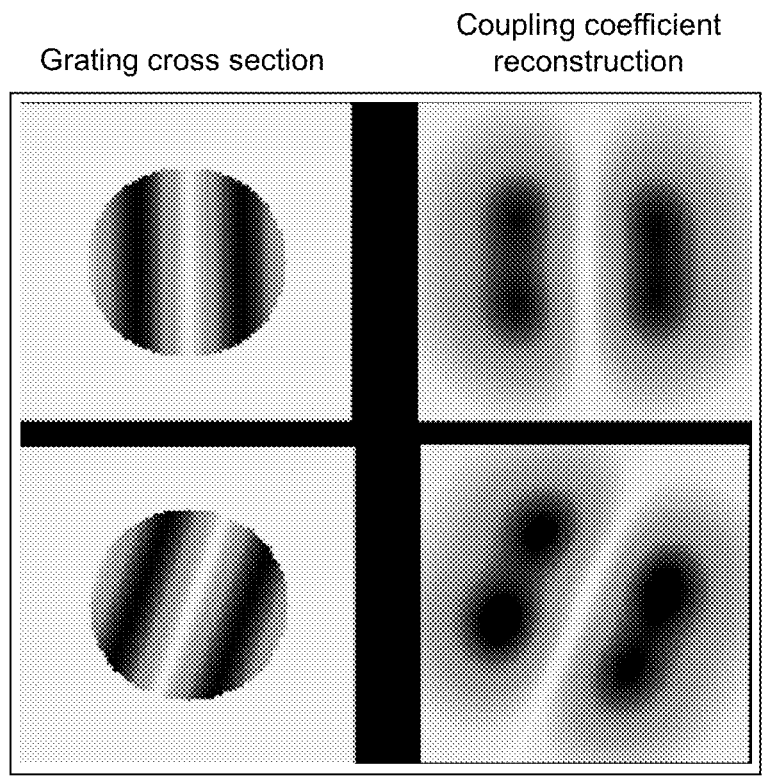
FIG. 21 shows simulated compound tilted grating index profiles and the profiles reconstructed from the overlap function decomposition.

FIG. 21 shows decomposition functions for decomposing index perturbation for this example.

By measuring the phase and amplitude of all six coupling coefficients, $\kappa_{mn}$, the grating modulation (e.g., changes in the grating caused by strain, stress, and/or twist), $\eta(r,\theta)e^{-ikz}$, may be reconstructed using these coefficients, $\kappa_{mn}$, as the weight factor on summation of the decomposition function $\xi_{mn}(r,\theta)$.

$$\eta(\vec{p}) \approx \Sigma \kappa_{mn}\xi_{mn}(r,\theta) = \Sigma \kappa_{mn} E_m(r,\theta)E_n^*(r,\theta).$$

This decomposition method of determining the distribution of a Bragg grating across the cross section of a single multimode core was simulated for two tilted and overlapped Bragg gratings, such as described above. The plots in FIG. 21 represent the grating amplitude across the core cross-section and show simulated, compound, tilted grating index profiles on the left and the grating profiles successfully reconstructed from the overlap function decomposition on the right. The top two images are without fiber twist, the bottom two with twist. The simulation results show that the overlap integrals provide significant reconstruction capability and the lower right reconstruction shows that twist of the grating structure can be determined.

Before measurements are taken with a single multimode core, a "baseline" or reference measurement with the fiber in a known orientation, in this case straight and untwisted, as performed. Thereafter, normal measurements may be made with fiber moved, e.g., bent and/or twisted. A phase "deformation" δϕ is then calculated based upon the phase change between these baseline and normal measurements.

$$\delta\phi(r,\theta) = \angle\{\eta_{move}(r,\theta)\cdot\eta_{base}^*(r,\theta)\}$$

Or equivalently in the x, y coordinate system:

$$\delta\phi(x,y) = \angle\{\eta_{move}(x,y)\cdot\eta_{base}^*(x,y)\}$$

Between the base and the moved measurement for this example, there can be a horizontal bend, $b_x$, that will be a linear phase change as a function of x, a vertical bend, $b_y$, that will be a linear phase change as a function of y, a stretch, ε, that will be constant change over the surface, or a twist, τ, that will be a rotation of the entire complex (phase and amplitude) scattering cross section.

Estimates can be determined for each of these shape parameters $b_x$, $b_y$, ε, and τ. These estimates can essentially function as a shape conversion matrix to convert from phase measurements to pitch, yaw, twist and strain.

$$\varepsilon = L \iint \eta_{move}(x,y) \cdot \eta_{base}^*(x,y) dA$$

-continued $$b_x = \max \int\int \eta_{move}(x,y) \cdot \eta_{base}^*(x,y) e^{ib_x} dA$$

$$b_y = \max \int\int \eta_{move}(x,y) \cdot \eta_{base}^*(x,y) e^{ib_y} dA$$

$$\tau = \max \int_0^{2\pi} \eta_{move}(r,\theta) \cdot \eta_{base}^*(r, \theta + \tau) d\theta$$

With the bend, twist, and strain terms $b_x$, $b_y$, $\varepsilon$, and $\tau$, the shape of the fiber may be determined using three dimensional rotations and projections described in U.S. Pat. Nos. 7,781,724 and 8,773,650 identified in the introduction.

Measurement of Coupling Coefficients

In addition to using the measured coupling coefficients ($\kappa_{mn}$) to determine the index perturbation in a single multimode core, some embodiments also measure the coupling coefficients. Some embodiments get the energy from single mode fibers into and out of each of the different modes in a way that is power efficient (the detecting fibers are typically coupled to photodiode detectors in an Optical Frequency Domain Reflectometry (OFDR) system). As one option, a fused tapered coupler, tapering multiple single mode fibers and fusing them to different locations on the multimode core, may be an option if the tapering can be done as the mode coupling was monitored in a 3×3 coupler. Another option abuts a bundle of single mode cores up against the larger multimode core. Some embodiments use this option when the cores are surrounded by little or no cladding. Another option is to image the multimode core directly onto a bundle of single mode fibers with a large magnification. Some embodiments use this option when the system can function with the inefficiencies resulting from light that may be captured by the cladding surrounding each of the single mode fibers.

Figure 22:
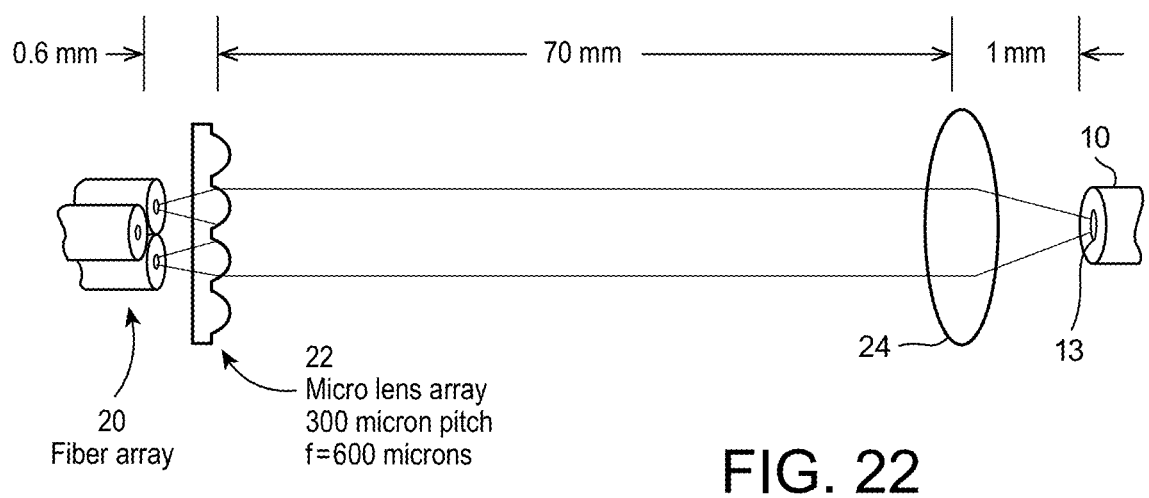
FIG. 22 shows an example of a bulk-optic design for coupling laser light from a fiber array into a single core fiber.

Some embodiments including this last option of directly imaging the multimode core reduce the inefficiencies by using a micro lens array with a sufficiently large fill-factor and a numerical aperture (NA) that matches the optical fiber with the multimode core more closely (e.g., between 0.1 and 0.25 in some cases). An example of a bulk-optic design for getting energy from each of the different modes into a corresponding single-mode detecting fiber in a way that is power efficient is shown in FIG. 22. The design may use a commercially-available microlens array 22 and includes a fiber array 20 of three single core, single mode detecting fibers for directing light from each of the three modes of light provided from a single multimode core 13 in a single core multimode sensing fiber 10 into three single core, single mode detecting fibers in the fiber array 20. Multimode light from multimode core 13 is imaged by lens 24 to the microlens array 22.

FIG. 22 shows specific values for dimensions and other parameters that are useful for specific embodiments, and are only examples and are not limiting.

Figure 23:
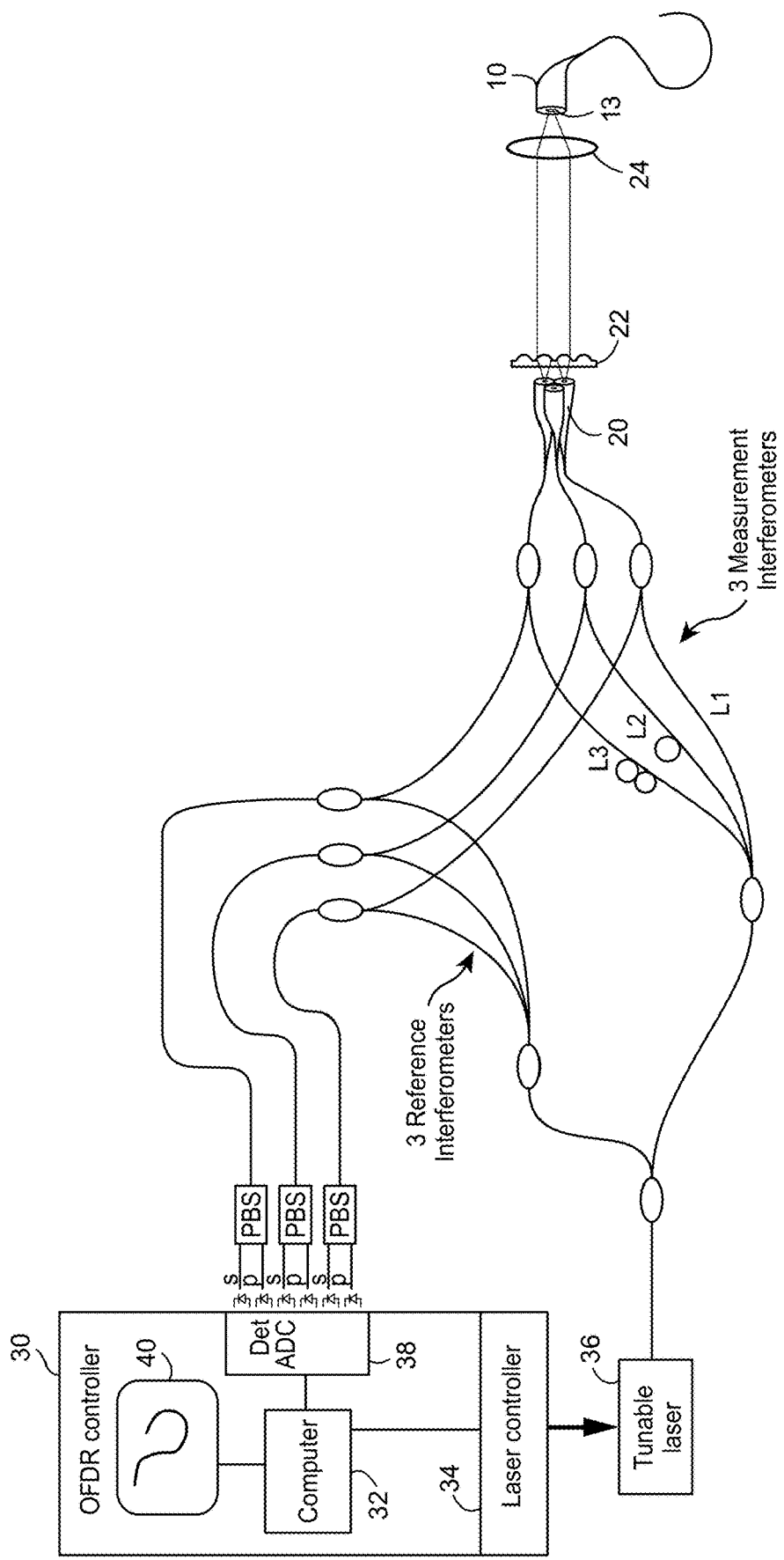
FIG. 23 shows an example system for interrogating a single core, multiple mode sensing fiber.

The optical coupling mechanism shown in FIG. 22 is included in FIG. 23. FIG. 23 shows an example system for interrogating a single core multimode sensing fiber 10 with multiple modes. The interrogation system is controlled by an OFDR controller 30 that includes one or more computers 32 coupled to (i) a laser controller 34 that controls a tunable laser 36 through a range of frequencies or wavelengths, (ii) a display, and (iii) acquisition circuitry including photodiodes, analog to digital conversion circuitry, sampling circuitry. Because there are three modes, there are three reference branches and three measurement branches of different lengths coupled to three single mode fibers that are coupled to three polarization beams splitters (PBSs) that convert the interfered light for each mode into s and p polarizations for detection by respective s and p photodiodes. The laser controller 34 controls the tunable laser 36 to probe the single core multimode sensing fiber 10 with three separate single core fibers in the three measurement branches, each with a unique delay corresponding to a different length of fiber L, L1, and L2. The laser light from each of the three input fibers is coupled via the fiber array 20 through the microlens array 22 and lens 24 into the single core 13, and the reflected light from each of the three modes from the single core grating is delivered by the microlens array 22 to its corresponding single core single mode detecting fiber in the fiber array 20 for detection and processing in the OFDR controller 30.

If the delays of the three input fibers are larger than the total delay associated with the single core multimode sensing fiber 10, then all of the cross coupled terms between input and output fibers of the measurement interferometer will appear at different delays and on unique detectors. If the fiber lengths for each output fiber are the same, then the overall delay is determined by the input fiber in this example.

Figure 24:
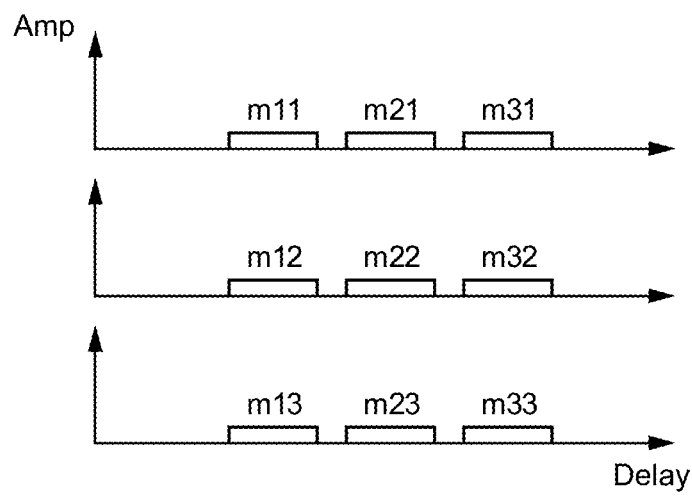
FIG. 24 illustrates delay locations of time-domain measurements of the coupling coefficients.

FIG. 24 are graphs that illustrate 9 coupling terms m11-m33. The three graphs of amplitude vs. delay represent the amplitude of light detected on each of the three detectors at the acquisition circuitry 38 corresponding to the three single mode fibers in the fiber array 20. The first subscript on the coupling terms, m, identifies the input fiber and the second subscript identifies the output fiber (the detector the signal is detected on). So m31 represents the amount of light sent in on fiber 3 and detected on detector fiber 1.

Extraction of Fiber Modal Coupling from Instrumentation Coefficients

As demonstrated above, the index perturbation (grating) may be determined by measuring the cross coupling coefficients detected at the multiple (three in the example) single mode fibers in the fiber array 20 that correspond to but are not identical to the modes of the single core 13 in the single core multimode sensing fiber 10. FIG. 24 described above illustrates the coupling coefficients between the three measured components coupled to the single mode fibers in the fiber array 20. These cross-coupling coefficients for these single mode fibers can be measured directly by the OFDR controller 30, but they need to be connected or converted to the actual modal cross-coupling coefficients for the three modes of the single core 13 in the single core multimode sensing fiber 10.

Figure 25:
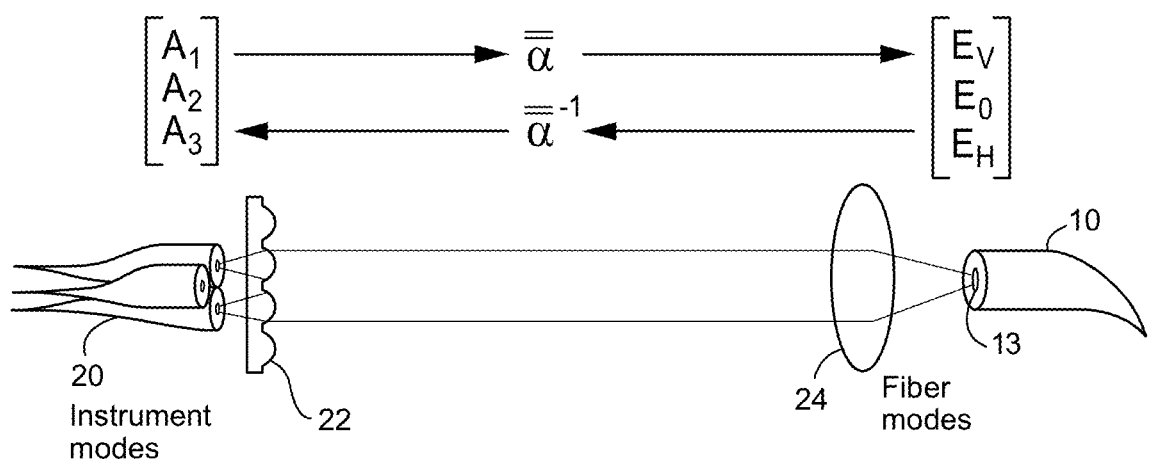
FIG. 25 shows an example model of an optical connection system as a matrix.

Some embodiments make this connection or conversion using a matrix, $\overline{\alpha}$, that describes how the light from the three input fibers in the fiber array 20 couples into the three modes supported in the single multimode core 13 of the single core multimode sensing fiber 10. FIG. 25 shows an example model of an optical connection system as two matrices connected by the alpha matrix $\overline{\alpha}$. FIG. 25 is represented using the mathematical expression below:

$$\begin{bmatrix} A_1 \\ A_2 \\ A_3 \end{bmatrix} = \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} \begin{bmatrix} E_V \\ E_0 \\ E_H \end{bmatrix} = \vec{A}_{out} = \overline{\alpha}\vec{E}$$

where $\vec{A}_{out}$ is the vector formed by the fields in each of the single-mode input/probe fibers in the fiber array 20, $\vec{E}$ is the vector composed of the field in each of the three fiber modes in the single core 13, and $\overline{\alpha}$ is the connecting matrix that couples the multimode fiber modes $\vec{E}$ to the single mode fiber fields $\vec{A}_{out}$. $E_0$ is the circularly symmetric LP01 mode, $E_V$ is the vertically oriented LP11 mode, and $E_H$ is the horizontally oriented LP11 mode. Light can travel in both directions, and the conversion from light in the individual single mode cores in the fiber array 20 to the light in the modes of the single core multimode sensing fiber 10 are given by, $$\begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix}^{-1} \begin{bmatrix} A_1 \\ A_2 \\ A_3 \end{bmatrix} = \begin{bmatrix} E_V \\ E_0 \\ E_H \end{bmatrix} = \overline{\alpha}^{-1} \vec{A}_{out} = \vec{E}$$

The expression is now written for the light traveling from the single-mode fibers in the fiber array 20, through the optics (microlens array 22 and lens 24) into the single core multimode sensing fiber 10, then being coupled into the backward traveling mode, and then back through the optics (microlens array 22 and lens 24) and into the single-mode fibers in the fiber array 20 as follows:

$$\vec{A}_{out} = \overline{\alpha}\overline{K}\overline{\alpha}^{-1} \vec{A}_{in} = \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} \begin{bmatrix} \kappa_{11} & \kappa_{21} & \kappa_{31} \\ \kappa_{21} & \kappa_{22} & \kappa_{32} \\ \kappa_{31} & \kappa_{32} & \kappa_{33} \end{bmatrix} \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix}^{-1} \begin{bmatrix} A_1 \\ A_2 \\ A_3 \end{bmatrix}$$

The combination of the above three matrices, $\overline{\alpha}\overline{K}\overline{\alpha}^{-1}$, forms the overall coupling coefficients between input fibers and output fibers shown in FIG. 24 and is referred to hereafter as the $\overline{M}$ matrix.

$$\vec{A}_{out} = \overline{\alpha}\overline{K}\overline{\alpha}^{-1} \vec{A}_{in} = \begin{bmatrix} m_{11} & m_{21} & m_{31} \\ m_{21} & m_{22} & m_{32} \\ m_{31} & m_{32} & m_{33} \end{bmatrix} \begin{bmatrix} A_1 \\ A_2 \\ A_3 \end{bmatrix} = \overline{M}\vec{A}_{in}$$

In this example, $\overline{\alpha}\overline{K}\overline{\alpha}^{-1}$ is what is measured with the time-delayed interrogation network shown in FIG. 23. Although the objective is to determine the modal cross-coupling coefficients represented by the cross-coupling coefficients matrix $\overline{K}$ corresponding to the state of the core grating, what can be actually measured by the OFDR interrogation system is the $\overline{M}$ matrix.

Figure 26:
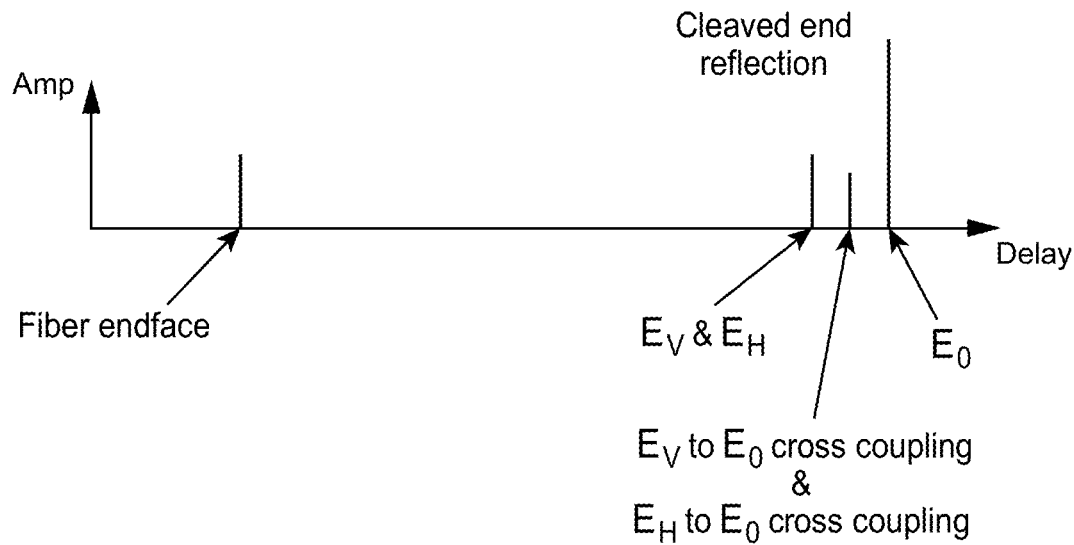
FIG. 26 is a graph of an example impulse response of a few-mode fiber with a cleaved end.

Embodiments determine the elements that form the matrix $\overline{M}$ in the following manner. An OFDR scan of a single core multimode fiber with a cleaved end is used to separate out the $E_0$ (LP01) mode based upon propagation time to the end of the cleave and also to separate the cross coupling terms. FIG. 26 is a graph of an example impulse response or propagation delay of a single core multimode fiber with a cleaved end. The reflection from the cleaved end is shown and labeled as "fiber endface." The different propagation modes propagate along the fiber at different speeds, which means they can be separated and identified. For example, because the $E_0$ (LP01) mode has a longer propagation time, its reflection will arrive later at the OFDR detector than the $E_V$ and $E_H$ (LP11) mode reflections. The light that travels down the fiber in the $E_0$ (LP01) mode and couples to the $E_V$ and $E_H$ (LP11) modes at the cleave will arrive with a delay exactly in between the two modes.

Figure 27:
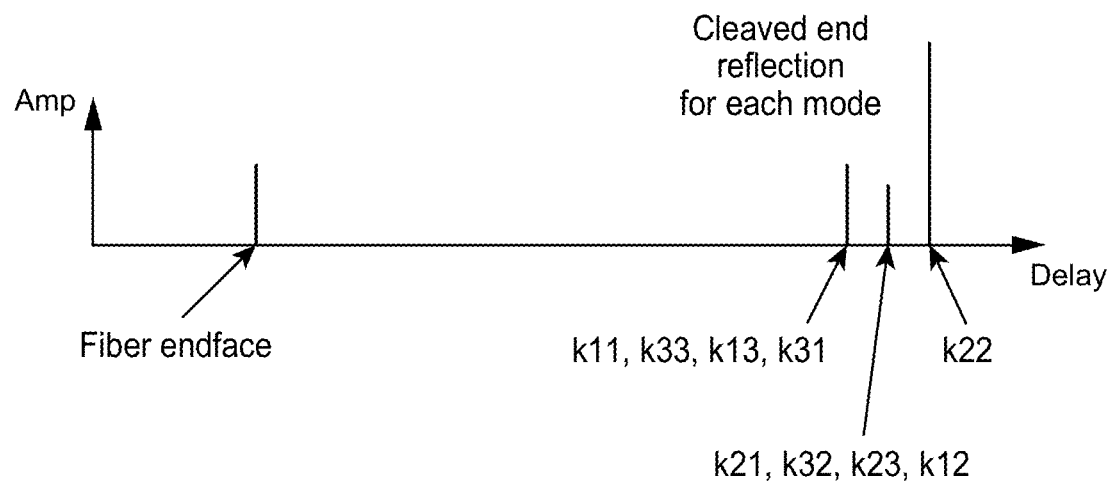
FIG. 27 is a graph of an example impulse response drawing with coupling coefficients labeled.

FIG. 27 is a graph of the example impulse response delays in FIG. 26 relabeled to identify the modal assignments (coupling coefficients). From FIG. 27, the three groups of coupling coefficients can be separated and filtered around each of the different delays (the distinct and separate impulse response amplitude lines). The terms are isolated by first windowing the complex data around the reflection peak, and then performing a Fourier transform to compute the frequency domain complex spectrum of the peak. First, the reflected coupling coefficient $\kappa_{22}$ for mode $E_0$ (LP01) is isolated using the windowing and transformation to mathematically separate the peak on all channels and at all offset delays to give a matrix of filtered values.

$$\overline{M_0} = \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} \begin{bmatrix} 0 & 0 & 0 \\ 0 & \kappa_{22} & 0 \\ 0 & 0 & 0 \end{bmatrix} \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix}^{-1}$$

To implement this isolation in this example, the OFDR controller applies a time domain window filter (like a bandpass filter) around the $E_0$ (LP01) delay peak.

Next, the light that travels exclusively in the $E_V$ and $E_H$ (LP11) modes and corresponding to the following is isolated:

$$\overline{M_1} = \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} \begin{bmatrix} \kappa_{11} & 0 & \kappa_{31} \\ 0 & 0 & 0 \\ \kappa_{13} & 0 & \kappa_{33} \end{bmatrix} \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix}^{-1}$$

And finally the light that crosses between $E_0$ (LP01) and the $E_V$ and $E_H$ (LP11) modes at the cleave is isolated as follows:

$$\overline{M_2} = \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} \begin{bmatrix} 0 & \kappa_{21} & 0 \\ \kappa_{12} & 0 & \kappa_{32} \\ 0 & \kappa_{23} & 0 \end{bmatrix} \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix}^{-1}$$

Next, assuming a flat, 0 degree cleave at the end of the fiber, the cross coupling terms ($\kappa_{13}$ and $\kappa_{31}$) are driven to zero because the perturbations function $\eta(r,\theta)$ for a zero degree cleave is a constant, giving a simplified matrix:

$$\overline{M_1} = \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} \begin{bmatrix} \kappa_{11} & 0 & 0 \\ 0 & 0 & 0 \\ 0 & 0 & \kappa_{33} \end{bmatrix} \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix}^{-1}$$

Adding $\overline{M_0}$ and $\overline{M_1}$ together gives the following diagonal matrix between the input and output coupling matrices.

$$\overline{M_0} + \overline{M_1} = \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} \begin{bmatrix} \kappa_{11} & 0 & 0 \\ 0 & \kappa_{22} & 0 \\ 0 & 0 & \kappa_{33} \end{bmatrix} \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix}^{-1}$$

which can be rewritten as by moving the inverse matrix to the left side of the equality:

$$\overline{M_0} + \overline{M_1} \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} = \begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix} \begin{bmatrix} \kappa_{11} & 0 & 0 \\ 0 & \kappa_{22} & 0 \\ 0 & 0 & \kappa_{33} \end{bmatrix}$$

This last equation takes the form of an eigenvalue problem:

$$\overline{AS} = \overline{SA}$$

where S is a matrix whose columns are the eigenvectors of A and Λ is a diagonal matrix whose elements are the eigenvalues. Since matrix A can be measured by the OFDR interrogation system, the coupling coefficients ($\kappa_{11}$, $\kappa_{22}$, and $\kappa_{33}$) can be determined.

Finding the matrices that convert the measurements, $\overline{M}_0 + \overline{M}_1$, to the mode coupling coefficients ($\kappa_{11}$, $\kappa_{22}$, and $\kappa_{33}$) is now an eigenvalue problem where the coupling coefficients ($\kappa_{11}$, $\kappa_{22}$, and $\kappa_{33}$) are the eigenvalues of the matrix, $\overline{M}_0 + \overline{M}_1$.

The connector matrix:

$$\begin{bmatrix} \alpha_{11} & \alpha_{21} & \alpha_{31} \\ \alpha_{21} & \alpha_{22} & \alpha_{32} \\ \alpha_{31} & \alpha_{32} & \alpha_{33} \end{bmatrix}$$

can be constructed from the eigenvectors of $\overline{M}_0 + \overline{M}_1$ using linear algebra.

Once the connector $\overline{\alpha}$ matrix, which defines coupling between the single mode fibers and the single core multimode sensing fiber, is determined, it remains constant for a given fiber connection. This connector $\overline{\alpha}$ matrix and its inverse define how light couples from the OFDR interrogation system to the modes of the single core multimode sensing fiber and back. Knowing the values for this connector $\overline{\alpha}$ matrix and the input light, the output light is measured by the OFDR interrogation system, and from these three things, the OFDR interrogation system calculates the values of the current modal cross coupling coefficients, or the $\overline{K}$ matrix. Based on these modal cross coupling coefficient values, the phase perturbations in the single core multimode sensing fiber 10 that produced the measured coupling (κ) coefficients and which represent the state of the grating in the single core multimode sensing fiber 10 are calculated. From these determined phase perturbations corresponding to the state of the core grating, the bend and twist of the single core multimode sensing fiber 10 can be calculated at every point along the single core multimode fiber 10. These bend and twist values can then be used to calculate the shape of the multimode sensing fiber 10.

Accounting for Group Delay Differences Between Modes

The approach described above provides measurements of the coupling between modes along the length of the single core multimode sensing fiber 10 as a function of time delay. In some embodiments, further corrections are made to address differing group velocities between modes. For example, to address the differing group velocities causing the mode coupling coefficients ($\overline{\kappa}$) to be spread over different delay ranges depending on which modes the light propagated in and for how long.

Figure 28:
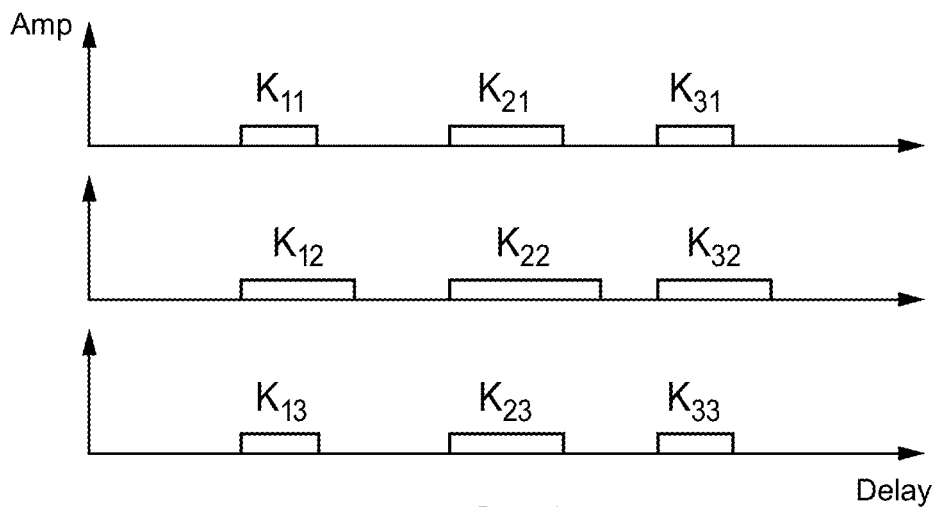
FIG. 28 graphs example fiber mode responses with exaggerated time-length differences.

FIG. 28 graphs example fiber mode responses with exaggerated time-length differences to illustrate how the effective length of the fiber appears to be different for each of the modes due to differences in group delay between the modes. In FIG. 24, the time delay amounts are the same, while in FIG. 28, the time delay amounts are different due to group delay effects. These group delay effects can be accounted for by resampling the data when the coupling coefficients are identified. In some embodiments, the coupling coefficients identification includes mapping the physical location in the fiber where the coupling took place to the same index for each mode. Here, the term index is the location along the length of the fiber before it has been scaled to engineering lengths. The data is lined up to represent the same location at the same index. This mapping is performed for each of the 6 independent coupling coefficients in this example (although there are 9 coupling coefficients, several have the same effective group index such as $\kappa_{13}$ and $\kappa_{31}$).

Figure 29:
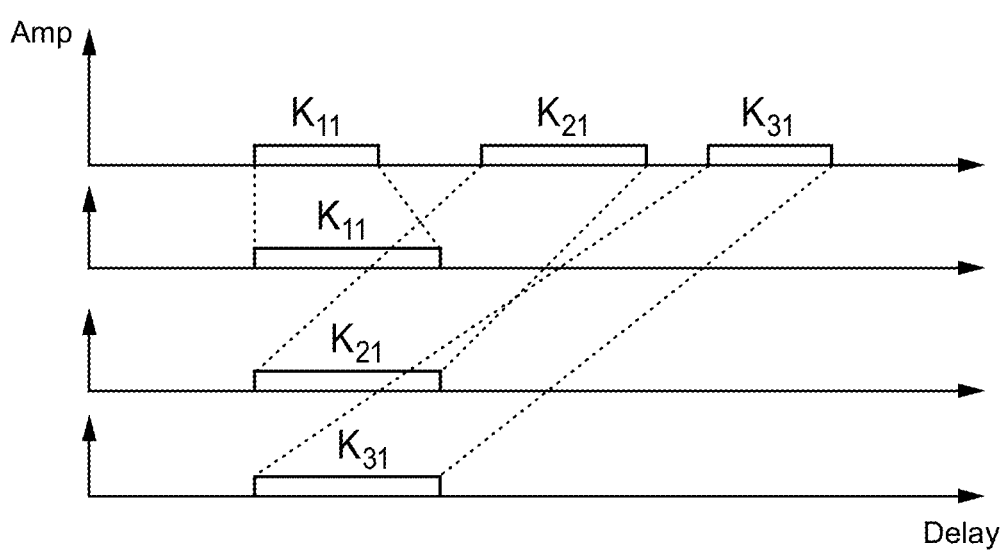
FIG. 29 graphs example resampling and alignment of coupling coefficients.

FIG. 29 is a graph showing an example of resampling and alignment of coupling coefficients $\kappa_{11}$, $\kappa_{21}$, and $\kappa_{31}$ showing conversion of them from the time domain to the spatial domain (the horizontal axis in FIG. 29 aligns with the z axis of the single core multimode sensing fiber 10. This conversion is accomplished by multiplying the time label of each of the coupling coefficients $\kappa_{11}$, $\kappa_{21}$, and $\kappa_{31}$ in the time domain by the speed of light for that coupling coefficient.

Figure 30:
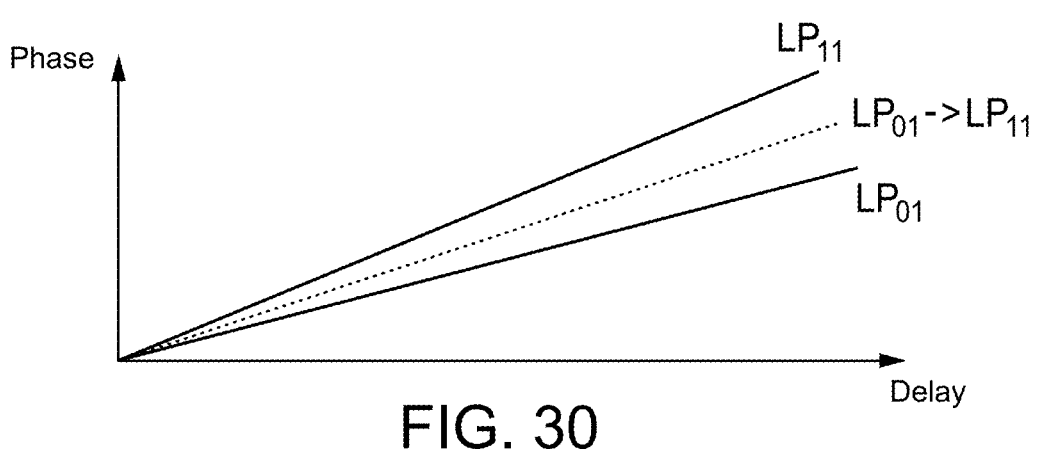
FIG. 30 graphs example phase accumulations for different coupling coefficients as a function of delay.

In addition to propagating with different group delays, each mode also propagates with a different wavenumber, or effective refractive index, meaning that each mode accumulates phase at a different rate as it propagates down the single core multimode sensing fiber 10. FIG. 30 graphs example phase accumulations for different coupling coefficients as a function of delay.

The LP11 and LP01 self-coupling terms are both weighted integrals over the single core multimode sensing fiber 10 in this example. As a result, even for random Rayleigh scatter, the LP11 and LP01 self-coupling terms are substantially similar. If the sensing fiber is straight, this common term in the coupling terms allows precise measurements of the difference between the phase propagation terms for the LP11 and LP01 modes along the fiber length. Further, this difference in effective refractive index can be used to predict the phase change in the cross term phases, such as by assuming the cross term phase accumulations are exactly halfway between the pure LP11 and LP01 phase delays. These calculated phase changes due to the different effective refractive indexes of the modes are then applied to the measured and resampled coupling coefficients before the scattering cross section is calculated.

Figure 31:
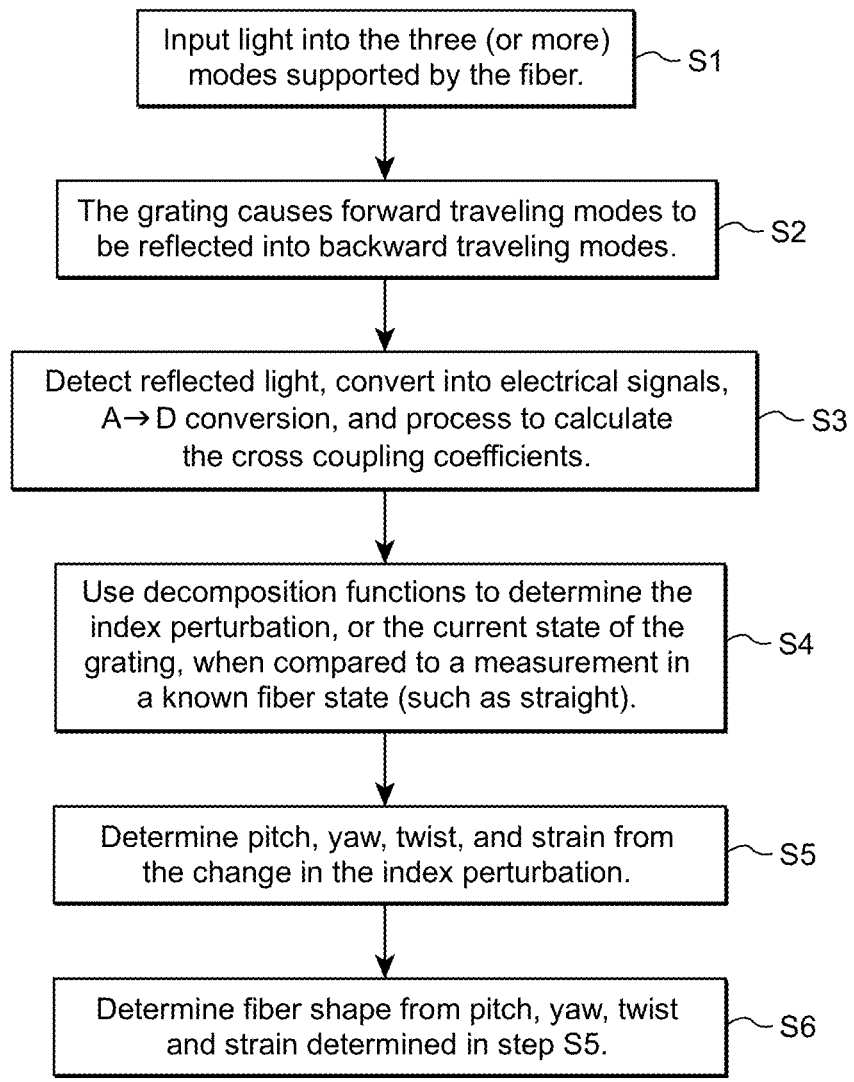
FIG. 31 is a flowchart showing example procedures for using a single core, multiple mode fiber for sensing shape in accordance with example embodiments.

FIG. 31 is a flowchart showing example procedures for using a single core, multiple mode fiber for sensing shape in accordance with example embodiments. In step S1, light is input into three (or more) modes supported by the single multimode core fiber. The grating of the core causes forward traveling modes to be reflected into backward traveling modes as shown in step S2. In step S3, reflected light is detected, converted into electrical signals, converted from analog format into digital format, processed in the OFDR controller to calculate the cross coupling coefficients. In step S4, decomposition functions are used to determine the index perturbation, or the current state of the grating, when compared to a measurement in a known state (such as the fiber positioned in a straight line). At step S5, the pitch, yaw, twist, and strain from the change in the index perturbation is determined. Then, in step S6, the fiber shape is determined from the pitch, yaw, twist, and strain determined in step S5.

Figure 32:
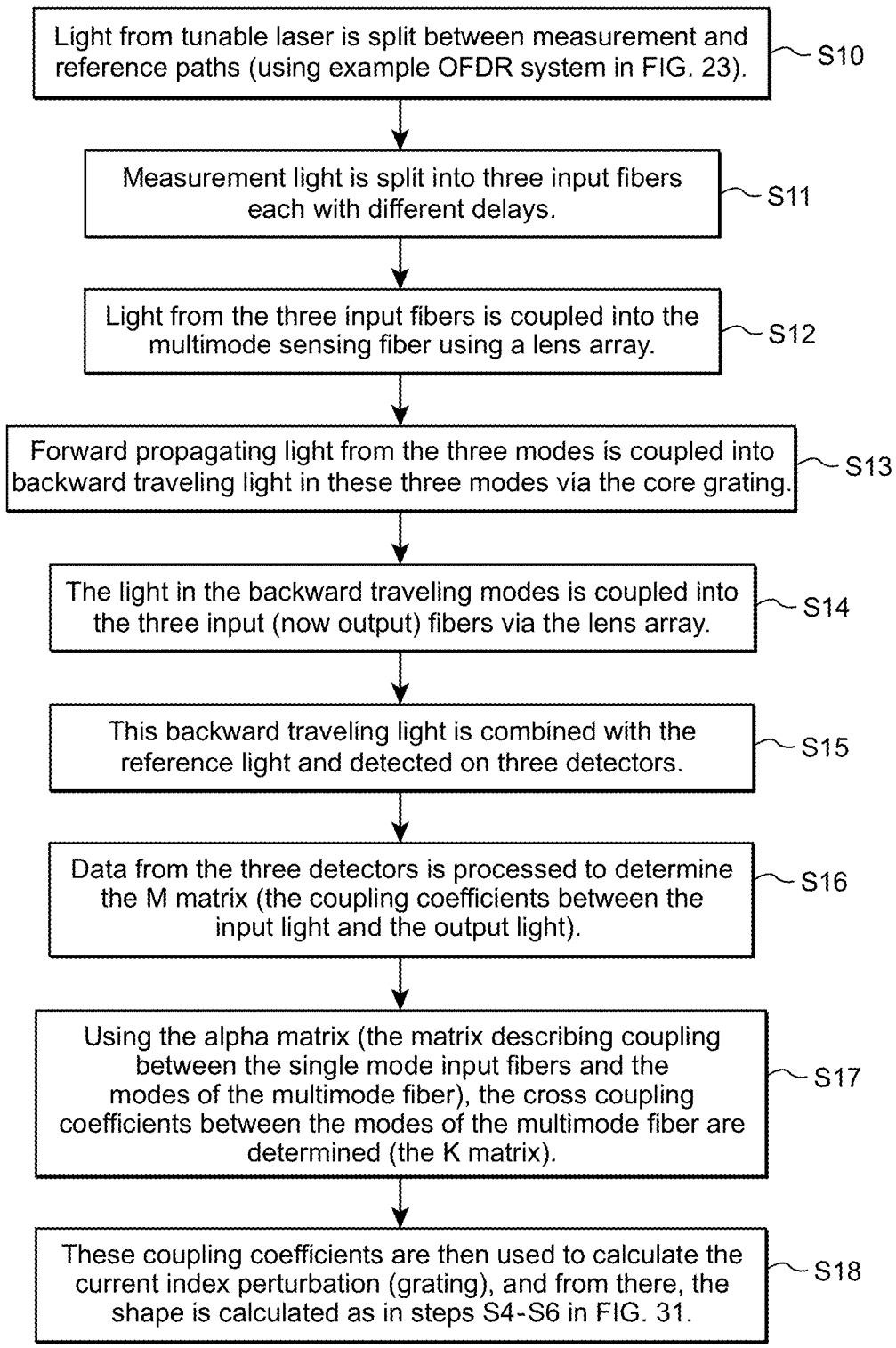
FIG. 32 is a flowchart showing example procedures for using a single core, multiple mode fiber for sensing shape in accordance with example embodiments.

FIG. 32 is a flowchart showing example procedures for using a single core, multiple mode fiber for sensing shape in accordance with example embodiments. In step S10, light from the tunable laser is split between measurement and reference paths using for example the OFDR system in FIG. 23. In step S11, the measurement light is split into three input fibers, each input fiber having a different delay. In step S12, light from the three input fibers is coupled into the single core multimode sensing fiber using a lens array. In step S13, forward propagating life from the three modes is coupled into backward traveling light in the three modes via the core grating. In step S14, the light in the backward traveling modes is coupled into the three single mode fibers (now output fibers) via the lens array. In step S15, this backward traveling light is combined with the reference light and detected on three detectors. In step S16, data from the three detectors is processed to determine the M matrix which couples the coupling coefficients between the input light and the output light. In step S17, using the alpha matrix, which is the matrix describing the coupling between the single mode input fibers and the modes of the single core multimode fiber, cross coupling coefficients between the modes of the single core multimode fiber are determined. These cross coupling coefficients form the K matrix. In step S18, these cross coupling coefficients are then used to calculate the current index perturbation, which is the core grating, and from there, the shape of the single core multimode sensing fiber is calculated as in steps S4-S6 in FIG. 31.

Figure 33:
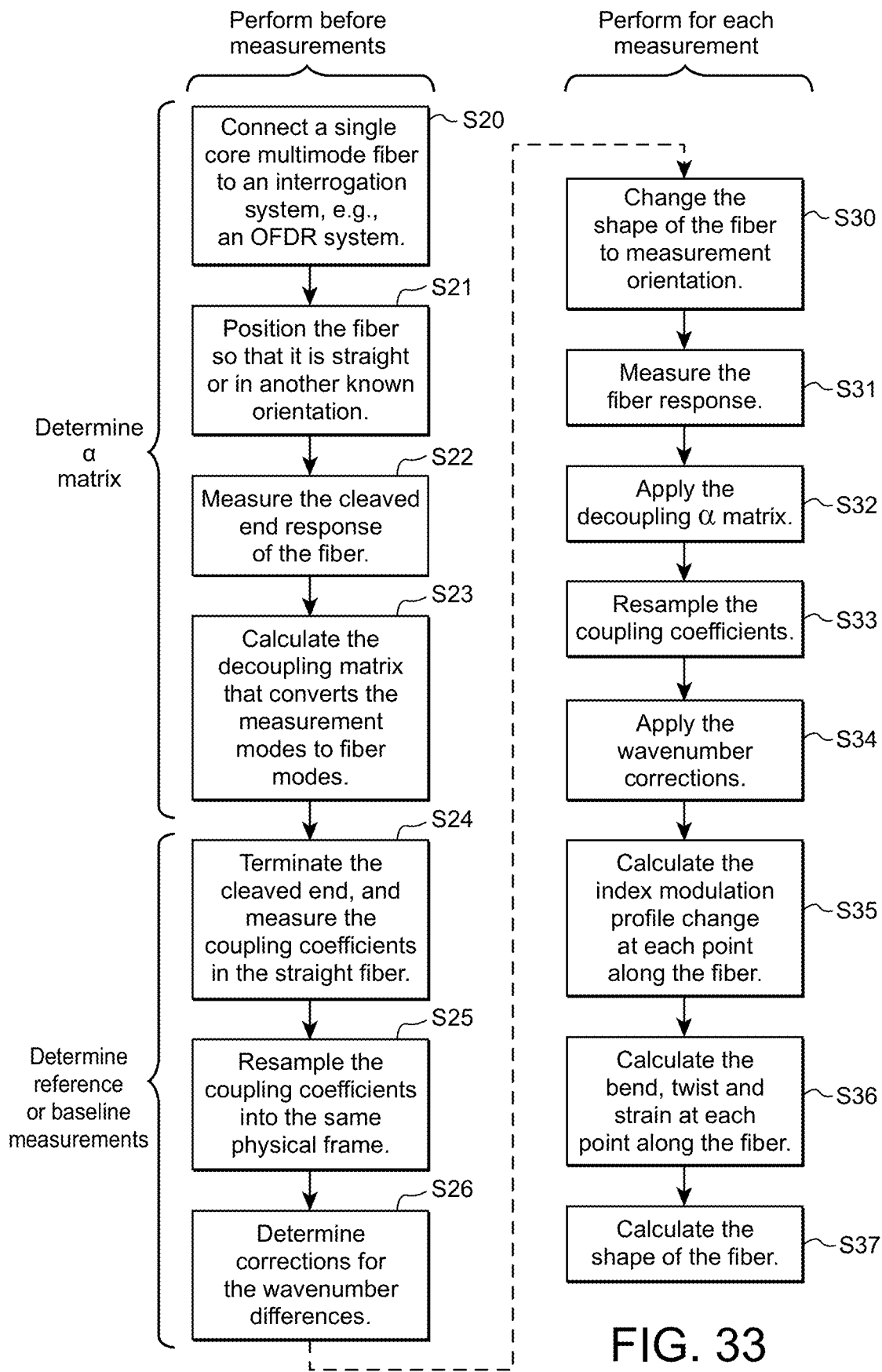
FIG. 33 is a flowchart showing example procedures for calibrating and then using a single core, multiple mode fiber for sensing shape in accordance with example embodiments.

FIG. 33 is a flowchart showing example procedures for calibrating and then using a single core, multiple mode fiber for sensing shape in accordance with example embodiments. Two different process stages are included and coupled loosely with a dashed line. The first process stage is performed before the fiber is used for shape measurements. The second process stage is used when the sensing fiber is to perform shape measurement.

In step S20, the single core multimode fiber is connected to a multimode interrogation system such as the OFDR system shown in FIG. 23. In step S21, the shape sensing fiber is positioned in a straight line or in another known orientation. The cleaved end response of the fiber is measured in step S22. Then, the decoupling matrix is calculated to convert the measurement modes to fiber modes in step S23. The decoupling matrix is referred to above as the alpha matrix and is determined following steps S20-S23. The next steps S24 through S26 relate to determining reference or baseline measurements of the shape sensing fiber in a known state. In step S24, the cleaved end is terminated, and the coupling coefficients are measured for the shape sensing fiber. In step S25, the coupling coefficients are resampled into the same physical frame. Then, in step S26, corrections are determined for the wavenumber differences.

Moving over to the next process stage of the flowchart, step S30 describes changing the shape of the fiber to a measurement orientation. In step S31, the fiber response is measured using the interrogation system. Then, the decoupling or alpha matrix is applied to the measured response in step S32. The coupling coefficients are resampled in step S33, and the wavenumber corrections are applied in step S34. The index modulation profile change is calculated at each point along the sensing fiber in step S35. In step S36, the bend, twist, and strain are calculated each point along the fiber, and from these values, the shape of the sensing fiber is calculated in step S37.

Example Multimode Single Core Fiber Sensor Twist Sensitivity

Having determined how to make and use a single core multimode fiber to determine shape using an OFDR interrogation method and overlapped tilted gratings, the inventors tested different fiber core sizes and estimated their sensitivity to detecting twist.

An example fiber that admits only three modes was designed and then checked to verify that this fiber provides reasonable twist sensitivity. The number of modes in a step-index multimode fiber is described by a normalized frequency parameter known as the V-number. A V-number of around 3.5 was selected in order to guide the LP11 modes tightly, while excluding the LP21 and LP02 modes.

Figure 36:
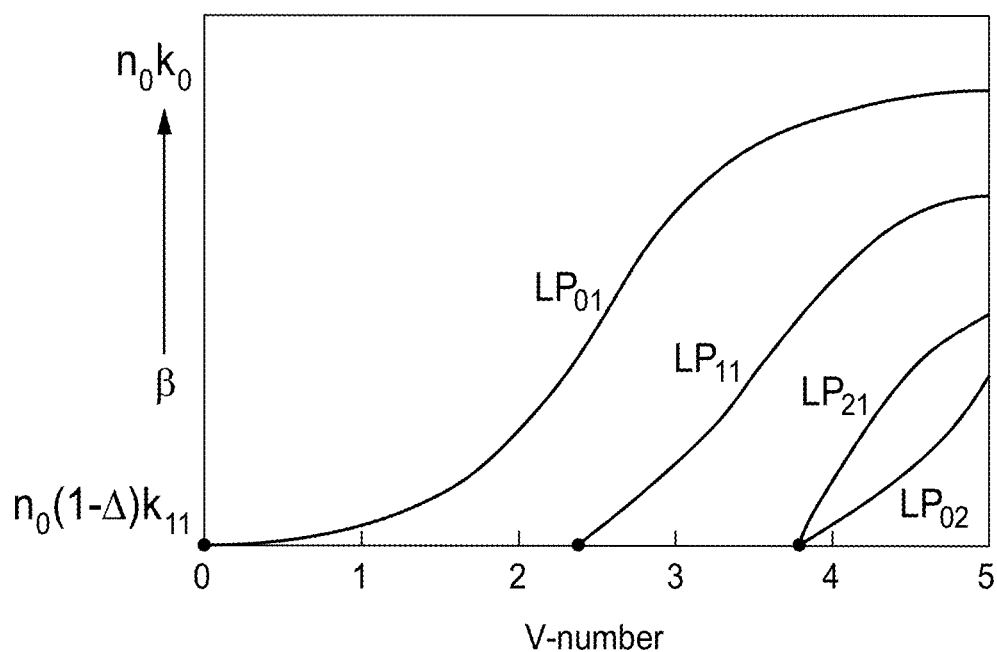
FIG. 36 is a graph showing modal propagation values for Linear Polarization Modes vs. V-number.

FIG. 36 is a graph showing modal propagation values for Linear Polarization Modes vs. V-number. The V-number is given by the equation below.

$$V = \frac{2\pi r}{\lambda}\sqrt{n_1^2 - n_2^2} = \frac{2\pi r}{\lambda}NA$$

where $n_1$ is the index of refraction of the core, $n_2$ is the index of the cladding, is the wavelength of the light, r is the core radius, and NA is the Numerical Aperture. Using V=3.5, the selected operating wavelength, and a selected Numerical Aperture permits calculation of the core radius as follows:

$$3.5 = \frac{2\pi r}{1540 \times 10^{-9}} 0.2$$

Solving for r yields:

$$\frac{3.5(1540 \times 10^{-9})}{0.2 \cdot 2\pi} = r = 4.3 \times 10^{-6}.$$

Figure 34A:
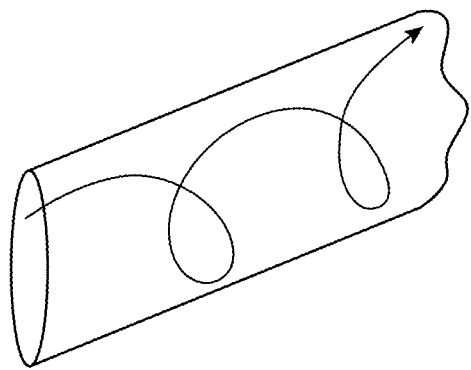
FIGS. 34A and 34B show a skew ray in a fiber core and an axial ray in a fiber core, respectively.
Figure 37:
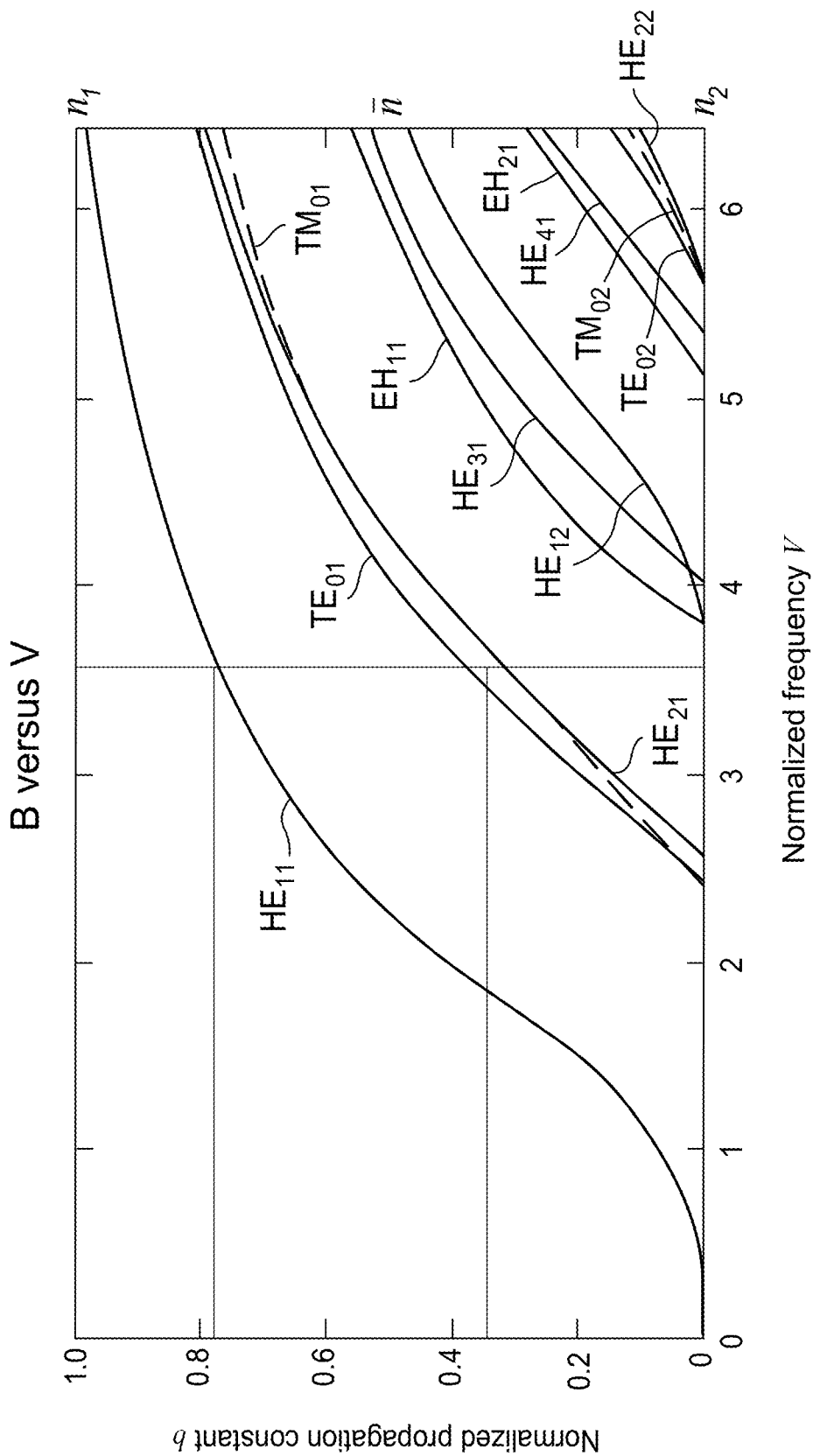
FIG. 37 is a graph showing normalized propagation constant B versus normalized frequency V for TE and TM modes.

The rotational period of the skew rays (e.g., as shown in FIG. 34A) can be calculated from the difference in the wavenumbers between the modes present in the fiber. This difference may be characterized by the parameter b, which can be used to calculate the wavenumbers for each mode. FIG. 37 is a graph showing a normalized propagation constant B versus normalized frequency V for TE and TM modes. This graph is used to identify values for b at the selected V number of 3.5 as $b_0$=0.34 and $b_1$=0.75. The definition of the b number is $$b = \frac{\beta^2 - k_2^2}{k_1^2 - k_2^2},$$

where $\beta$ is the propagation constant and k is the wavenumber. The definition of the wave number is $$k_1 = \frac{2\pi}{\lambda}n_1.$$

The propagation constant $\beta$ as a function of b is solved in accordance with:

$$\sqrt{b(k_1^2 - k_2^2) + k_2^2} = \beta$$

Factoring out the vacuum wavenumber, $$\frac{2\pi}{\lambda},$$

collecting terms, and applying the definition of Numerical Aperture (NA) in an optical fiber, NA=$\sqrt{n_1^2 - n_2^2}$, this equation may be expressed as:

$$\frac{2\pi}{\lambda}NA\sqrt{b + \frac{n_2^2}{NA^2}} = \beta.$$

An expression for the beat length between the two non-degenerate modes is:

$$\frac{2\pi}{\lambda}NA\left[\sqrt{b_1 + \frac{n_2^2}{NA^2}} - \sqrt{b_0 + \frac{n_2^2}{NA^2}}\right] = \beta_1 - \beta_0.$$

Pulling the common terms out from under the radicals and factoring out the common terms results in:

$$\frac{2\pi}{\lambda}n_2\left[\sqrt{1 + \frac{b_1}{n_2^2}NA^2} - \sqrt{1 + \frac{b_0}{n_2^2}NA^2}\right] = \beta_1 - \beta_0.$$

A binomial approximation is applied to the terms under the radicals, and terms are canceled and common factors removed to yield:

$$\frac{\pi}{\lambda}\frac{NA^2}{n_2}[b_1 - b_0] = \beta_1 - \beta_0 = \Delta\beta.$$

Substituting numerical values gives:

$$\frac{\pi}{1540\times 10^{-9}}\frac{0.2^2}{1.47}[0.75 - 0.34] = (55{,}510)(0.41) = 23\times 10^3 = \Delta\beta.$$

Using $$L = \frac{2\pi}{\Delta\beta}$$

gives a beat length of 270 microns.

Estimating twist sensitivity using an approximate radius for the higher order modes of r=0.002 mm produces:

$$\frac{r^2}{L} = \frac{(0.002 \text{ mm})^2}{0.270} = 14\times 10^6 \text{ mm}.$$

This twist sensitivity may be doubled to a value that is about half of the sensitivity in a multi-core shape sensing fiber. This demonstrates that a simple step-index, three-mode single core fiber has sufficient twist sensitivity to function as an effective shape sensor.

Figure 34B:
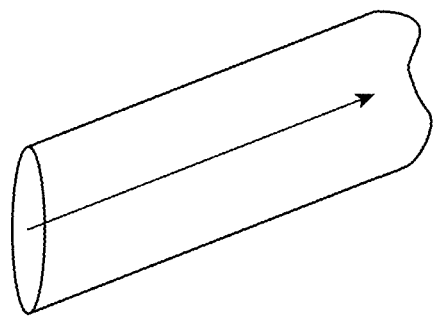
Figure 35:
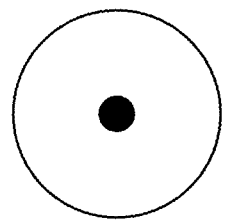
FIG. 35 shows an example single core fiber with three modes.
Figure 38:
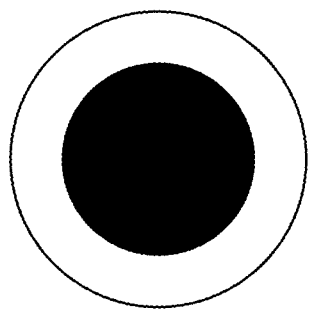
FIG. 38 shows an example single large core fiber with 200 modes.

Different shape cores with different numbers of multi-modes may be used. For example, a single small core as shown in FIG. 35 supports just a few (e.g., 3) modes, whereas a single large core as shown in FIG. 38 supports many (e.g., 200) modes in addition to the axial ray (shown in FIG. 34B) and skew rays (shown in FIG. 34A) described above. Further, all of these modes can couple together when the fiber is perturbed, leading to a multitude of interactions that are measured in order to get accurate results. This large number of measurements may or may not be worthwhile depending on the application.

Figure 39:
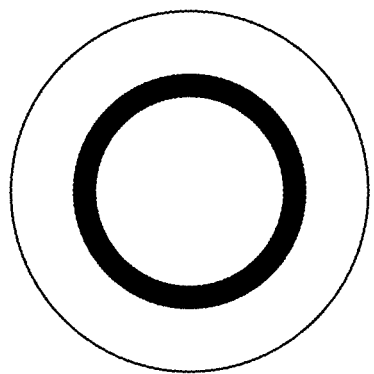
FIG. 39 shows an example single core fiber where the core is annular and supports 30 modes.

FIG. 39 shows an example single core multimode fiber where the core is annular and supports 30 modes. Additional sensitivity afforded by the larger core shown in FIG. 38 may be achieved using an annular core and eliminate the interior modes. Recognizing that axial rays can actually propagate parallel to the axis, but not on the axis, the annular core limits the number of modes present and the complexity of the measurement.

The technology described provides a single core multimode fiber that can be used to accurately sense shape and can be manufactured quite simply and cost effectively as compared to multicore shape sensing fiber.

The technology described above also has wide and diverse applications. One non-limiting example application is to a fiber optic shape sensing system for a robotic surgical arm in which one or more of the various technical features and/or embodiments described above may be used.

The techniques described herein can be implemented using a control system including at least one memory and at least one processor, and often a plurality of processors. The control system also includes programmed instructions (e.g., a computer-readable medium storing the instructions) to implement some or all of the methods described in accordance with aspects disclosed herein. The control system may include two or more data processing circuits with one portion of the processing optionally being performed on or adjacent the tool, and another portion of the processing being performed at a station (e.g. an operator input system or central processing system or the like) remote from the tool. Any of a wide variety of centralized or distributed data processing architectures may be employed. Similarly, the programmed instructions may be implemented as a number of separate programs or subroutines, or they may be integrated into a number of other aspects of the teleoperational systems described herein. In one embodiment, the control system supports wireless communication protocols such as Bluetooth, IrDA, HomeRF, IEEE 802.11, DECT, and Wireless Telemetry.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke 35 USC § 112(f) unless the words "means for" or "step for" are used. Furthermore, no embodiment, feature, component, or step in this specification is intended to be dedicated to the public regardless of whether the embodiment, feature, component, or step is recited in the claims.

We claim:

1. A system for interrogating an optical sensing fiber comprising a multimode core, the system comprising:
    multiple reference branches and multiple measurement branches, the multiple measurement branches comprising an array of single-core, single-mode optical fibers, each optical fiber of the array of single-core, single-mode optical fibers having a different optical delay;
    a tunable laser configured to generate laser light over a range of wavelengths, the laser light configured to be coupled into the multiple reference branches and the multiple measurement branches for interferometrically probing the multimode core; and
    a micro lens array and collimator lens configured to optically couple the laser light from the array of single-core, single-mode optical fibers into the multimode core, and configured to image backward traveling multimode light from the multimode core onto the array of single-core, single-mode optical fibers, wherein light from each mode of the backward traveling multimode light is directed into a corresponding fiber of the single-core, single-mode optical fibers.

2. The system of claim 1, wherein the micro lens array has a numerical aperture between 0.1 and 0.25.

3. The system of claim 1, further comprising acquisition circuitry, the acquisition circuitry comprising multiple detectors configured to detect measurement interferometric data at an output of the multiple interferometers, the measurement interferometric data corresponding to reference light combined with the backward traveling multimode light directed into the array of single-core, single-mode optical fibers.

4. The system of claim 3, further comprising data processing circuitry configured to:
determine coupling coefficients from the measurement interferometric data, the coupling coefficients being between light input from the array of single-core, single-mode optical fibers into the multimode core and light output from the multimode core to the array of single-core, single-mode optical fibers; and
determine, from the coupling coefficients, cross-coupling coefficients between forward traveling modes in the multimode core and backward traveling modes in the multimode core.

5. The system of claim 3, further comprising:
the optical sensing fiber, wherein the multimode core includes a grating pattern that varies with bend, strain, and twist applied to the optical sensing fiber; and
data processing circuitry configured to process the measurement interferometric data to determine a variation in the grating pattern, and to determine the bend, strain, and twist applied to the optical sensing fiber based at least in part on the variation in the grating pattern.

6. The system of claim 5, wherein the grating pattern comprises overlapping tilted grating written in the multimode core.

7. The system of claim 5, wherein the grating pattern is associated with a cross-sectional index perturbation of the optical sensing fiber, and wherein the cross-sectional index perturbation is associated with cross-coupling coefficients between forward traveling modes in the multimode core and backward traveling modes in the multimode core.

8. The system of claim 7, wherein the data processing circuitry is further configured to process the measurement interferometric data to determine the cross-coupling coefficients, and to determine the variation in the grating pattern based at least in part on the cross-coupling coefficients.

9. The system of claim 1, further comprising the optical sensing fiber, wherein the multimode core has a shape that limits a number of modes in the backward traveling multimode light in the multimode core below a predetermined number while providing a predetermined sensitivity to twist applied to the optical sensing fiber.

10. The system of claim 9, wherein the multimode core is ring-shaped in cross-section.

11. A method for interrogating an optical sensing fiber comprising a multimode core, the method comprising:
generating laser light over a range of wavelengths;
coupling the laser light into multiple interferometers, the multiple interferometers including multiple reference branches and multiple measurement branches, the multiple measurement branches comprising an array of single-core, single-mode optical fibers, each fiber of the array of single-core, single-mode optical fibers having a different optical delay; and
using a micro lens array and a collimator lens to couple the laser light from the array of single-core, single-mode optical fibers into the multimode core, and to image backward traveling multimode light from the multimode core onto the array of single-core, single-mode optical fibers, wherein light from each mode of the backward traveling multimode light is directed into a corresponding fiber of the single-core, single-mode optical fibers.

12. The method of claim 11, further comprising:
detecting, at an output of the multiple interferometers, measurement interferometric data corresponding to reference light combined with the backward traveling multimode light directed into the array of single-core, single-mode optical fibers.

13. The method of claim 12, further comprising:
determining coupling coefficients from the measurement interferometric data, the coupling coefficients being between light input from the array of single-core, single-mode optical fibers into the multimode core and light output from the multimode core to the array of single-core, single-mode optical fibers.

14. The method of claim 13, further comprising:
determining, from the coupling coefficients, cross-coupling coefficients between forward traveling modes in the multimode core and backward traveling modes in the multimode core.

15. The method of claim 12, wherein the multimode core includes a grating pattern that varies with bend, strain, and twist applied to the optical sensing fiber, the method further comprising:
determining a variation in the grating pattern based at least in part on the measurement interferometric data; and
determining, based at least in part on the variation in the grating pattern, the bend, strain, and twist applied to the optical sensing fiber.

16. The method of claim 15, wherein the grating pattern comprises overlapping tilted grating written in the multimode core.

17. The method of claim 15, wherein the grating pattern is associated with a cross-sectional index perturbation of the optical sensing fiber and the cross-sectional index perturbation is associated with cross-coupling coefficients between forward traveling modes in the multimode core and backward traveling modes in the multimode core, and wherein determining the variation in the grating pattern comprises:
processing the measurement interferometric data to determine the cross-coupling coefficients, and
determining the variation in the grating pattern based at least in part on the cross-coupling coefficients.

18. The method of claim 11, wherein the multimode core has a shape that limits a number of modes in the backward traveling multimode light in the multimode core below a predetermined number while providing a predetermined sensitivity to twist applied to the optical sensing fiber.

19. The method of claim 18, wherein the multimode core is ring-shaped in cross-section.

20. The method of claim 11, wherein the micro lens array has a numerical aperture between 0.1 and 0.25.

* * * * *